(12) United States Patent
Thrash et al.

(10) Patent No.: US 8,397,742 B2
(45) Date of Patent: Mar. 19, 2013

(54) SHUTTLE VALVE

(75) Inventors: Thomas Benjamin Thrash, Houston, TX (US); Patricia Thrash, legal representative, Houston, TX (US); Brian Frank Matteucci, Houston, TX (US)

(73) Assignee: DTL Technologies, L.P., Houston, TX (US)

( * ) Notice: Subject to any disclaimer, the term of this patent is extended or adjusted under 35 U.S.C. 154(b) by 403 days.

(21) Appl. No.: 12/653,707

(22) Filed: Dec. 17, 2009

(65) Prior Publication Data

US 2010/0154896 A1   Jun. 24, 2010

Related U.S. Application Data

(60) Provisional application No. 61/203,402, filed on Dec. 20, 2008.

(51) Int. Cl.
*F16K 11/07* (2006.01)

(52) U.S. Cl. .......... 137/112; 137/111; 137/113

(58) Field of Classification Search .......... 137/111, 137/112, 113
See application file for complete search history.

(56) References Cited

U.S. PATENT DOCUMENTS

| | | | |
|---|---|---|---|
| 2,364,743 A | 12/1944 | Morton | |
| 2,651,491 A * | 9/1953 | Ashton et al. | 137/112 |
| 2,654,564 A | 10/1953 | Pech | |
| 2,811,979 A * | 11/1957 | Presnell | 137/112 |
| 2,821,972 A * | 2/1958 | Banker | 123/434 |
| 3,038,487 A | 6/1962 | Gardner | |
| 3,151,624 A * | 10/1964 | Koutnik | 137/112 |
| 3,454,029 A | 7/1969 | Fredd | |
| 3,477,472 A | 11/1969 | Mercier | |
| 3,529,624 A | 9/1970 | Cryder | |
| 3,533,430 A | 10/1970 | Fredd | |
| 3,533,431 A * | 10/1970 | Kuenzel et al. | 137/113 |
| 3,550,611 A | 12/1970 | Baatrup | |
| 3,633,606 A * | 1/1972 | Hay et al. | 137/113 |
| 3,815,622 A | 6/1974 | Allen | |
| 4,187,871 A | 2/1980 | Hendrickson | |
| 4,253,481 A * | 3/1981 | Sarlls, Jr. | 137/112 |
| 4,301,825 A | 11/1981 | Simko | |
| 4,467,825 A | 8/1984 | Boyd | |
| 4,863,314 A * | 9/1989 | Baugh | 405/191 |
| 6,257,268 B1 * | 7/2001 | Hope et al. | 137/112 |
| 6,318,400 B1 * | 11/2001 | Hope et al. | 137/112 |
| 6,655,405 B2 * | 12/2003 | Hollister et al. | 137/102 |
| 6,779,543 B2 * | 8/2004 | Hollister et al. | 137/102 |
| 7,159,605 B2 * | 1/2007 | Thrash et al. | 137/15.21 |
| 7,225,831 B2 | 6/2007 | Hope et al. | |
| 7,243,671 B2 * | 7/2007 | Thrash et al. | 137/112 |
| 2007/0107904 A1 | 5/2007 | Donahue et al. | |

* cited by examiner

*Primary Examiner* — John K Fristoe, Jr.
*Assistant Examiner* — Minh Le
(74) *Attorney, Agent, or Firm* — Tim L. Burgess

(57) ABSTRACT

A shuttle valve useful in connection with operation of underwater blowout preventers employs soft seals sealing an annulus between an inlet bore and the outer periphery of the shuttle to provide hydraulic function control from a high pressure low flow supply source such as a low volume positive displacement pump on a remotely operated vehicle without losing opposing inlet sealing and hydraulic fluid dump the opposing inlet during a return stroke of the pump.

31 Claims, 20 Drawing Sheets

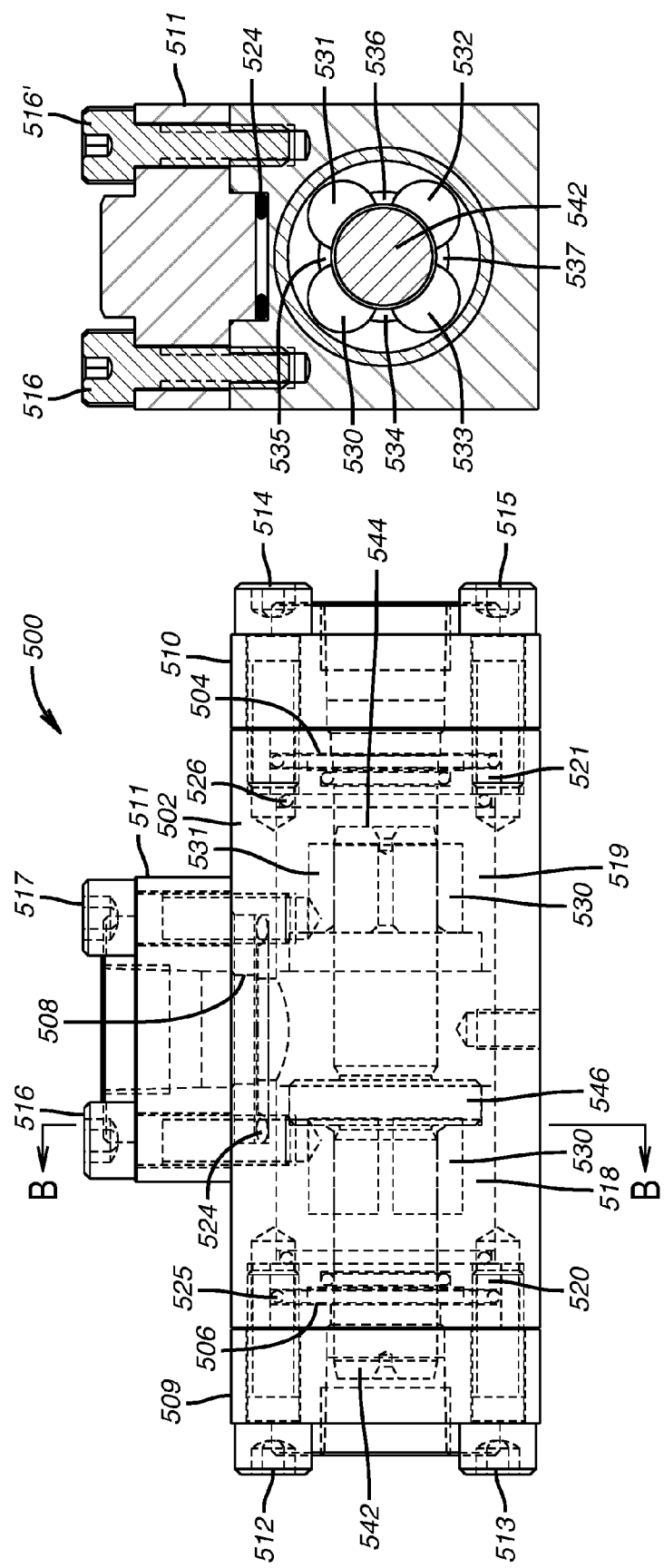

SHUTTLE VALVE

CROSS REFERENCE TO RELATED APPLICATIONS

This application claims the benefit of the filing date of U.S. Provisional Patent Application Ser. No. 61/203,402, filed on Dec. 20, 2008, the disclosures of which are incorporated herein by reference.

STATEMENT REGARDING FEDERALLY SPONSORED RESEARCH AND DEVELOPMENT

Not Applicable

BACKGROUND OF THE DISCLOSURE

1. Field of Disclosure

This invention relates to valves, and more particularly to shuttle valves.

2. Background

Subsea wellheads are often relied upon during deep water exploration for oil and natural gas. Subsea drilling operations may experience a blow out, which is an uncontrolled flow of formation fluids into the drilling well. Blow outs are dangerous and costly. Blow outs can cause loss of life, pollution, damage to drilling equipment, and loss of well production. To prevent blowouts, blowout prevention (BOP) equipment is required. The subsea wellheads include a stack of BOPs. Annular BOPs are actuated on a routine basis to snub or otherwise control pressure during normal drilling operations. Other blow-out preventers, such as blind rams, pipe rams, kelly rams and shear rams will also be included in the stack on the subsea wellhead. When these types of rams are actuated, operations in the well cease in order to control pressure or some other anomaly. Blind rams, pipe rams, kelly rams and shear rams are periodically tested to make sure that they are operational.

The well and BOP connect to the surface drilling vessel through a marine riser pipe, which connects to the BOP through a Lower Marine Riser Package ("LMRP") that contains flow control devices to supply hydraulic fluids for the operation of the BOP. The LMRP and the BOP are commonly referred to collectively as simply the BOP. Many BOP functions are hydraulically controlled, with piping attached to the riser supplying hydraulic fluids and other well control fluids. Shuttle valves attached to each BOP, as in U.S. Pat. Nos. 4,253,481 and 6,257,268 have been used for many years to control the flow of hydraulic fluid.

It is important that underwater shuttle valves used in connection with operation of subsea blowout preventers (BOPS) act properly because of the importance of their function and their inaccessibility. In emergency situations or during testing, it may be necessary to close the subsea BOPs using an alternate low flow circuit, a test pump, or in extreme situations a remotely operated vehicle (ROV). The ROV is an unmanned submarine with an on-board television camera so the ROV can be maneuvered by topside personnel on board a ship or platform. The ROV is equipped with a plug that stabs into a receptacle on the ROV docking station on the BOP stack. Tubing runs from the receptacle on the ROV docketing station to a biased shuttle valve.

The ROV is maneuvered to stab into the receptacle on the ROV docking station. The ROV uses a hydraulic pump to inject hydraulic fluid at relatively high pressures (greater than 1,000 psi) and relatively low flow rates into the hose to the biased shuttle valve to close the BOPs.

The Gilmore Valve Company pressure biased ROV shuttle valve with metal-to-metal seal as described in U.S. Pat. No. 6,257,268 is a current solution to allow a low flow (such as an ROV) to control a BOP Ram. Unfortunately this valve is very sensitive to reverse flow (one way flow), and in combination with the requirement of the metal-to-metal seal to stay rigidly seated not to leak, the valve will fail to provide BOP ram control from a low flow supply source like an ROV.

The high pressures and low flow rates required by a ROV mandate use of a low volume positive displacement pump. These are similar to a bicycle pump. Stroking forward pushes the fluid through an outlet check valve. When the stroke ends the flow stops and the outlet check valve closes. At this point the pump plunger is reversed back to the start position for another stroke and refilling of fluid into the stroking chamber from the pump inlet check valve. During the return stroke of the bike pump if the outlet check valve leaks ever so slightly, the line pressure on the outlet of the pump will decay because a small amount of fluid flowed back into the bike pump stroking chamber.

This is the scenario where the Gilmore valve will get into a situation of the shuttle lifting off of the inlet seat and dumping fluid. This creates a vicious cycle with the function port never obtaining pressure to actuate a function. This is a disadvantage of a "one way" communication at the ROV inlet port. This is also a disadvantage in the "blocked" situation, when the ROV disconnects by closing a valve to block in the pressure on the ROV inlet port of the valve, as a small leak will make the valve "dump" all of the function pressure/fluid back through the opposing inlet port. Another problem is that the flow volume from the ROV pump is not high enough to over come the leak rate of the metal-to-metal seat attempting to close the opposing inlet port. This type of seat in practice will leak until there is a substantial hydraulic force (via pressure acting on the area of the seat) pushing it firmly closed enough to make metal-to-metal contact completely around the perimeter of the seat. Until this force is exceeded, the valve will leak.

The valve exemplary embodiments herein described do not rely on a check valve (one-way communication) or metal to metal seat to maintain positive sealing and remain in control of the function pressure even when there is a decay in pressure or when closed when pressure is supplied to the function port and the ROV valve is blocked off.

BRIEF DESCRIPTION OF THE DRAWINGS

FIG. 21 is a schematic top view of a shuttle valve of a type useful in an exemplary embodiment of the invention.

FIG. 22 is a schematic cross sectional view in the direction along the lines B-B of FIG. 21.

DETAILED DESCRIPTION OF EMBODIMENTS

Figure 1:
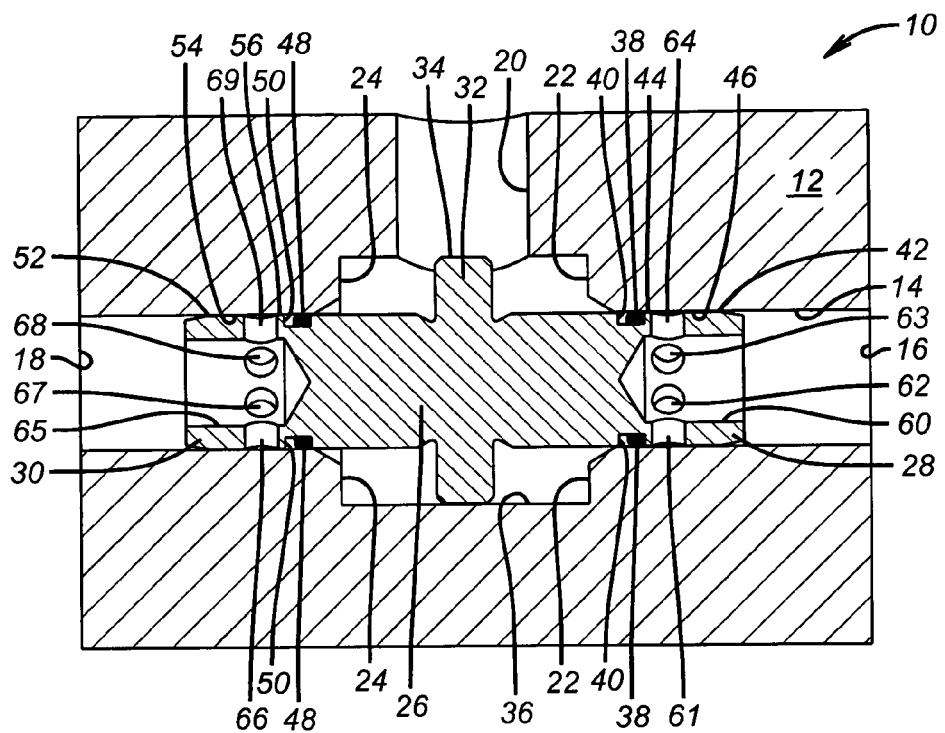
FIG. 1 is a schematic side sectional view of a first exemplary embodiment of the invention, showing a first shuttle position, blocking fluid flow.

In the following detailed description of exemplary embodiments, reference is made to the accompanying drawings, which form a part hereof and in which are shown by way of illustration examples of exemplary embodiments in which the invention may be practiced. In the drawings and descriptions, like parts are marked throughout the specification and drawings with the same reference numerals, respectively. The drawings are not necessarily to scale. Certain features of the invention may be shown exaggerated in scale or in somewhat schematic form and some details of conventional elements may not be shown in the interest of clarity and conciseness. Specific details described herein, including what is stated in the Abstract, are in every case a non-limiting description and exemplification of embodiments representing concrete ways in which the concepts of the invention may be practiced. This serves to teach one skilled in the art to employ the present invention in virtually any appropriately detailed system, structure or manner consistent with those concepts. Reference throughout this specification to "an exemplary embodiment" means that a particular feature, structure, or characteristic described in connection with the embodiment is included in at least one exemplary embodiment of the present invention. Thus, the appearances of the phrase "in an exemplary embodiment" in various places throughout this specification are not necessarily all referring to the same embodiment. Furthermore, the particular features, structures, or characteristics may be combined in any suitable manner in one or more embodiments. It will be seen that various changes and alternatives to the specific described embodiments and the details of those embodiments may be made within the scope of the invention. It will be appreciated that one or more of the elements depicted in the drawings can also be implemented in a more separated or integrated manner, or even removed or rendered as inoperable in certain cases, as is useful in accordance with a particular application. Because many varying and different embodiments may be made within the scope of the inventive concepts herein described and in the exemplary embodiments herein detailed, it is to be understood that the details herein are to be interpreted as illustrative and not as limiting the invention to that which is illustrated and described herein.

The various directions such as "upper," "lower," "back," "front," "transverse," "perpendicular", "vertical", "horizontal," "length," "width," "laterally" and so forth used in the detailed description of exemplary embodiments are made only for easier explanation in conjunction with the drawings. The components may be oriented differently while performing the same function and accomplishing the same result as the exemplary embodiments herein detailed embody the concepts of the invention, and such terminologies are not to be understood as limiting the concepts which the embodiments exemplify.

As used herein, the use of the word "a" or "an" when used in conjunction with the term "comprising" (or the synonymous "having") in the claims and/or the specification may mean "one," but it is also consistent with the meaning of "one or more," "at least one," and "one or more than one." In addition, as used herein, the phrase "connected to" means joined to or placed into communication with, either directly or through intermediate components.

Referring to FIG. 1, in an exemplary embodiment, a shuttle valve 10 includes a body generically indicated by reference number 12. Body 12 has an axial bore 14, a first fluid flow inlet port 16 to bore 14, a second fluid inlet port 18 to bore 14, and a fluid pressure function outlet 20 from bore 14. Outlet 20 is between inlet ports 16 and 18 and transverse to bore 14. Source fluid enters bore 14 through inlet ports 16 and 18. The term "inlet" is used in the sense of a fluid source passageway leading to one of inlet ports 16 or 18 exteriorly of ports 16 or 18. A passageway leading to one of inlet ports 16 or 18 from exteriorly of ports 16 or 18 may be coaxial to the port to which it leads or may originate from a source conduit transverse to the port 16 or 18. The term "outlet" is herein used in the sense of an outlet for flow when fluid flow through one of inlet ports 16 or 18 exceeds fluid pressure at outlet 20, as is the purposed use of outlet 20, namely, to supply pressure to a function requiring pressure for operation in a downstream apparatus. However, outlet 20 may flow fluid through it back through inlet port 16 or 18 if pressure in outlet 20 exceeds pressure in one of inlet port 16 or inlet port 18 whichever one created pressure in the outlet port 20.

Bore 14 widens proximate outlet 20 to form shoulders 22 and 24 flanking outlet 20. A shuttle, generally indicated by reference numeral 26, is coaxial with body bore 14 and has a first cylindrical end portion 28 and a second cylindrical end portion 30. First end portion 28 extends in the direction of first inlet port 16 and second end portion 30 extends in the direction opposite first end portion 28, in the exemplary embodiment, in the direction of second inlet port 18. Each end portion 28, 30 is coaxially slideably movable along the bore 14 under the force of fluid pressure from fluid entering either inlet port 16 or 18. Shuttle 26 has a collar 32 between first and second end portions 28, 30. Collar 32 has outer cylindrical surface 34 of diameter receivable within widened body bore 36 and greater than end portions 28, 30 and body bore 14. Shuttle 26 slideably moves from one shoulder to the other shoulder under the pressure of fluid in one of the inlet ports 16, 18 exceeding pressure in the other one of the inlet ports 16, 18. When collar 32 engages shoulder 22 on the side of first inlet port 16 of body bore 14, collar 32 does not engage shoulder 24 on the side of second inlet port 18 of bore 14, and when collar 32 engages shoulder 24 on the side of the second inlet port 18 of body bore 14, collar 32 does not engage shoulder 22 on the side of first inlet port 16 of bore 14.

In the exemplary embodiment depicted in FIG. 1, a first seal 38, suitably a Teflon O-ring seal, is fixed in seal groove 40 on the outer periphery 42 of first end portion 28 of shuttle 26, for sealing an annulus 44 between that outer periphery 42 and the inner periphery 46 of body bore 14 on the first inlet port side of bore 14 when collar 32 engages shoulder 22 on the side of first inlet port 16 of body bore 14. A second seal 48, suitably a Teflon O-ring seal or a Poly-seal, is fixed by seal groove 50 on outer periphery 52 of shuttle second end portion 30 and inner periphery 54 of bore 14 on the side of second inlet port 18, for sealing an annulus 56 between outer periphery 52 of the shuttle second end portion 30 and inner periphery 54 when collar 32 engages shoulder 24 on the side of second inlet port 18 of bore 14. First and second end portions 28, 30 each extend a distance from collar 32 relative to the placement of seals 38 and 48 sufficient that (i) when collar 32 engages shoulder 22 on the side of first inlet port 16 of bore 14, annulus 56 is not sealed, (ii) when collar 32 engages shoulder 24 on the side of second inlet port 18 of bore 14, annulus 44 not sealed, and (iii) when collar 32 does not engage and is distally spaced from both shoulder 22 and 24, both annulus 44 and annulus 56 are sealed. FIG. 1 depicts valve 10 in condition (iii) where collar 32 does not engage and is distally spaced from both shoulders 22 and 24, and both annulus 44 and annulus 56 are sealed. This position of the shuttle in valve 10 herein is sometimes is called a mid-stroke position.

In the exemplary embodiment of FIG. 1, end portions 28, 30 of shuttle 26 have a central bore 60, 65 respectively, and in each central bore have at least one passage connecting the central bore to periphery 42, 52 of shuttle 26. In the exemplary embodiment, a plurality of fluid passages 61, 62, 63, 64 (and suitably two others not seen in this view) radiate from bore 60 and a plurality of passages 66, 67, 68 and 69 (and suitably two others not seen in this view) radiate from central bore 65. Seal 38 is fixed on end portion 28 between collar 32 and the passages 61, 62, 63 and 64 radiating from central bore 60. Seal 48 is fixed on end portion 30 between collar 32 and the passages 66, 67, 68 and 69 radiating from central bore 65.

Figure 2:
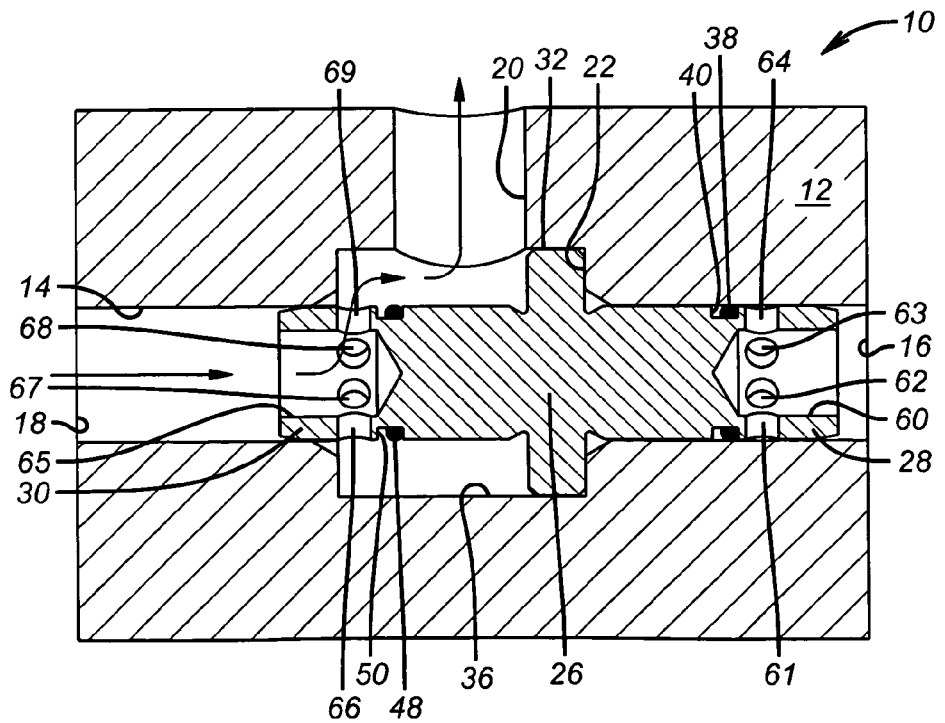
FIG. 2 is a schematic side sectional view of the exemplary embodiment of FIG. 1, showing a second shuttle position, providing flow

Referring to FIG. 2, when collar 32 engages shoulder 22 on the side of first inlet port 16 of bore 14, annulus 56 is not sealed and fluid flows through bore 65 thence through passages 66, 67, 68, and 69 (and two others not seen) into widened bore 14 to and out outlet 20. Or if pressure in fluid pressure function outlet 20 exceeds pressure in inlet port 18, fluid flows from outlet 20 through passages 66-69 (and two others not seen) through bore 65 into inlet port 18 of bore 14.

Conversely to FIG. 2, when collar 32 engages shoulder 24 on the side of second inlet port 18 of bore 14, annulus 44 is not sealed, and fluid flows through bore 60 thence through passages 61, 62, 63, and 64 (and two others not seen) into widened bore 14 to and out outlet 20. Or if pressure in fluid pressure function outlet 20 exceeds pressure in inlet port 16, fluid flows from outlet 20 through passages 61-64 (and two others not seen) through bore 60 into inlet port 16 of bore 14.

As shown in FIG. 1, when collar 32 does not engage either shoulder 22 or 24 and both annulus 44 and annulus 56 are sealed, fluid cannot escape through either bore 60 or 65 into their respective passages to widened bore 14 to and out outlet 20, and vice versa, fluid cannot escape from outlet 20 through the respective passages of bores 60 and 65 into either chamber 1 and inlet port 16 or chamber 2 and inlet port 18 of bore 14.

Figure 3:
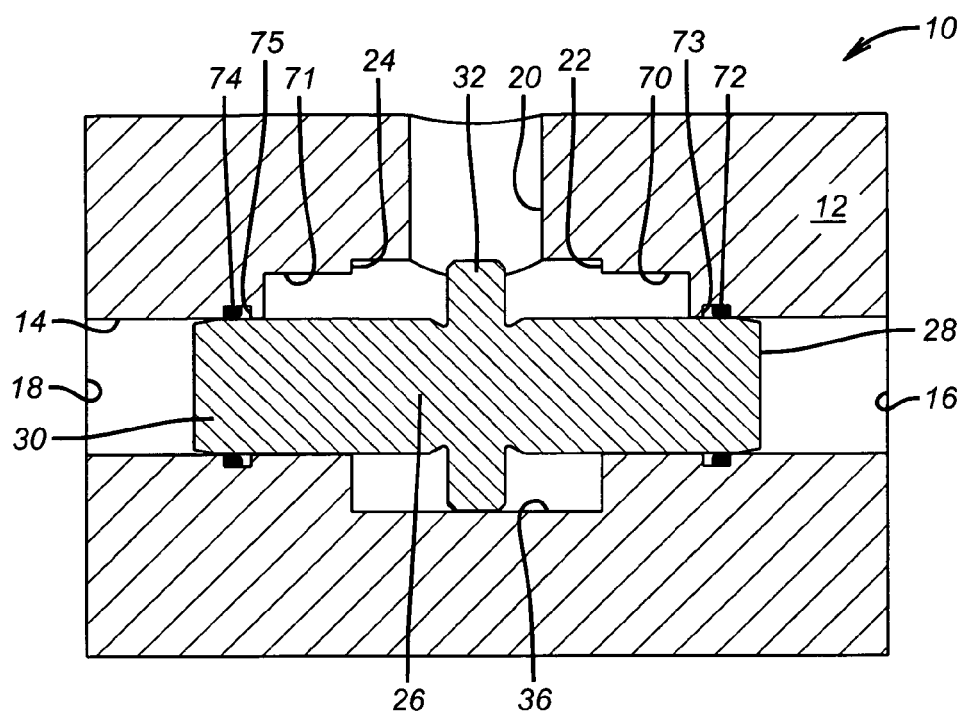
FIG. 3 is a schematic side sectional view of a second exemplary embodiment of the invention, showing a first shuttle position, blocking fluid flow.

Referring now to FIG. 3, another exemplary embodiment is depicted, in FIG. 3 also in mid-stroke position. As in the exemplary embodiment of FIG. 1, a shuttle valve 10 includes a body generically indicated by reference number 12. Body 12 has an axial bore 14, a first fluid flow inlet port 16 to bore 14, a second fluid inlet port 18 to bore 14, and a fluid pressure function outlet 20 from bore 14. Outlet 20 is between inlet ports 16 and 18 and transverse to bore 14. In FIG. 1, inlet ports 16 and 18 are segments of bore 14.

Bore 14 widens proximate outlet 20 to form shoulders 22 and 24 flanking outlet 20. Cylindrical sectors 70, 71 (as depicted), or alternatively an entirely circumferential groove or a plurality of grooves or other forms of fluid passage reliefs 70, 71 is or are formed in shoulders 22 and 24 adjacent bore 14.

In the exemplary embodiment of FIG. 3, as in the exemplary embodiment depicted in FIG. 1, shuttle 26, coaxial with body bore 14, has a first cylindrical end portion 28 and a second cylindrical end portion 30. First end portion 28 extends in the direction of first inlet port 16 and second end portion 30 extends in the direction opposite first end portion 28, in the exemplary embodiment, in the direction of second inlet port 18. Each end portion 28, is coaxially slideably movable along the bore 14 under the force of fluid pressure from fluid entering either inlet port 16 or 18. Shuttle 26 has a collar 32 between first and second end portions 28, 30. Collar 32 has outer cylindrical surface 34 of diameter receivable within widened body bore 36 and greater than end portions 28, 30 and body bore 14. Shuttle 26 slideably moves from one shoulder to the other shoulder under the pressure of fluid in one of the inlet ports 16, 18 exceeding pressure in the other one of the inlet ports 16, 18. When collar 32 engages shoulder 22 on the side of first inlet port 16 of body bore 14, collar 32 does not engage shoulder 24 on the side of second inlet port 18 of bore 14, and when collar 32 engages shoulder 24 on the side of the second inlet port 18 of body bore 14, collar 32 does not engage shoulder 22 on the side of first inlet port 16 of bore 14.

In the exemplary embodiment of FIG. 3, a first seal 72, suitably a Teflon O-ring seal, is fixed in seal groove 73 on the inner periphery 46 of first inlet port 16, for sealing annulus 44 between that inner periphery 46 and the outer periphery 42 of end portion 28 of shuttle 26 when collar 32 engages shoulder 22 on the side of first inlet port 16 of body bore 14. A second seal 74, suitably a Teflon O-ring seal, is fixed by seal groove 75 on the inner periphery 54 of second inlet port 18, for sealing annulus 56 between that inner periphery 54 and the outer periphery 52 of end portion 30 of shuttle 26 when collar 32 engages shoulder 24 on the side of second inlet port 18 of body bore 14. First and second end portions 28, 30 each extend a distance from collar 32 relative to the placement of seals 72 and 74 sufficient that (i) when collar 32 engages shoulder 22 on the side of first inlet port 16 of bore 14, annulus 56 is not sealed and fluid flows through fluid passage 71 to outlet 20, (ii) when collar 32 engages shoulder 24 on the side of second inlet port 18 of bore 14, annulus 44 is not sealed, and fluid flows through fluid passage 70 to outlet 20, and (iii) when collar 32 does not engage and is distally spaced from both shoulder 22 and 24, both annulus 44 and annulus 56 are sealed, and fluid does not flow either from inlet port 16 through fluid passage 70 or from inlet port 18 through or passage 71 to outlet 20, or vice versa, fluid cannot escape from outlet 20 through the respective passages of 70 or 71 into inlet port 16 or inlet port 18 of bore 14.

Figure 4:
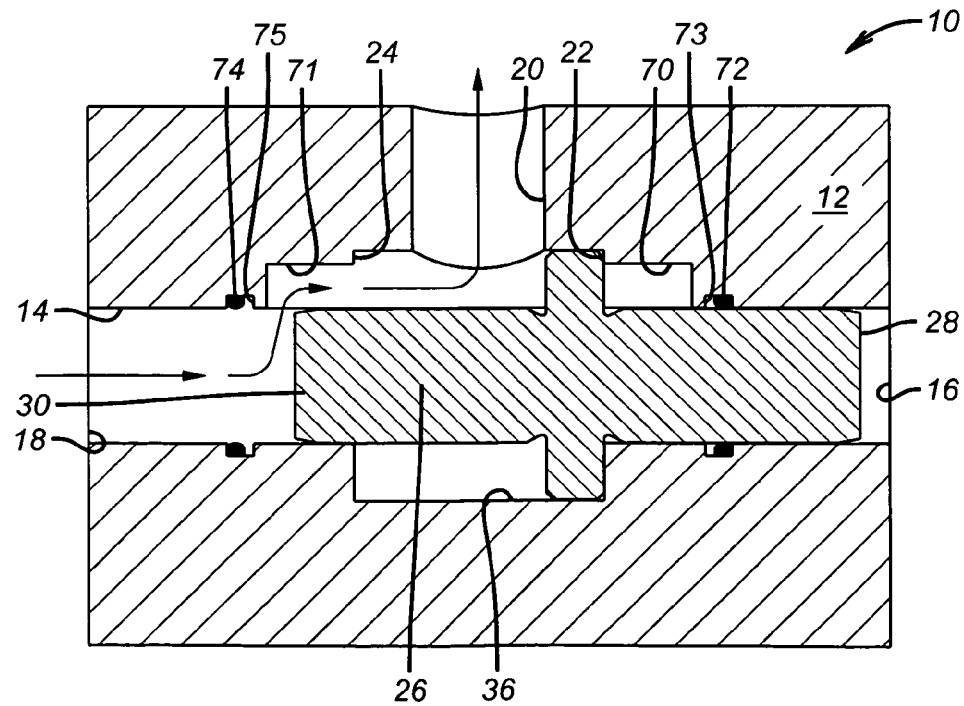
FIG. 4 is a schematic side sectional view of the exemplary embodiment of FIG. 3, showing a second shuttle position, providing flow.

FIG. 4 depicts fluid flow when collar 32 engages shoulder 22 on the side of first inlet port 16 of bore 14, so annulus 56 is not sealed, and fluid flows through fluid passageway 71 to outlet 20.

The exemplary embodiment of FIG. 1 places seals on both ends portion of shuttle 26 with fluid passages formed more distally from the shuttle collar than the seals, such that when an end portion containing the passages moves past the seal toward the opposite inlet port, fluid flows both through the annulus portion that is past the seals in the direction of the opposite inlet port and through the passages, flow through the passages exceeding flow through the annulus owing to the larger cross sectional flow area through the passages. The exemplary embodiment of FIG. 3 places seals on the bore and provides passages in the bore such that when an end portion moves past the seal toward the opposite inlet port, fluid flows both through the annulus portion that is past the seals in the direction of the opposite inlet port and through the passages in the wall of the bore, flow through the passages exceeding flow through the annulus owing to the larger cross sectional flow area through the passages. An alternative exemplary embodiment provides a combination of the flow solutions of exemplary embodiments of FIG. 1 and FIG. 3. For example, not shown, a valve 10 could provide seal 38 and bore 60 and passages 61-64 (and two not seen) on end portion 28 of shuttle 26, as in FIG. 1, and could provide seal 74 on end portion 30 and passage 71 in bore 14 as in FIG. 3.

Figure 5:
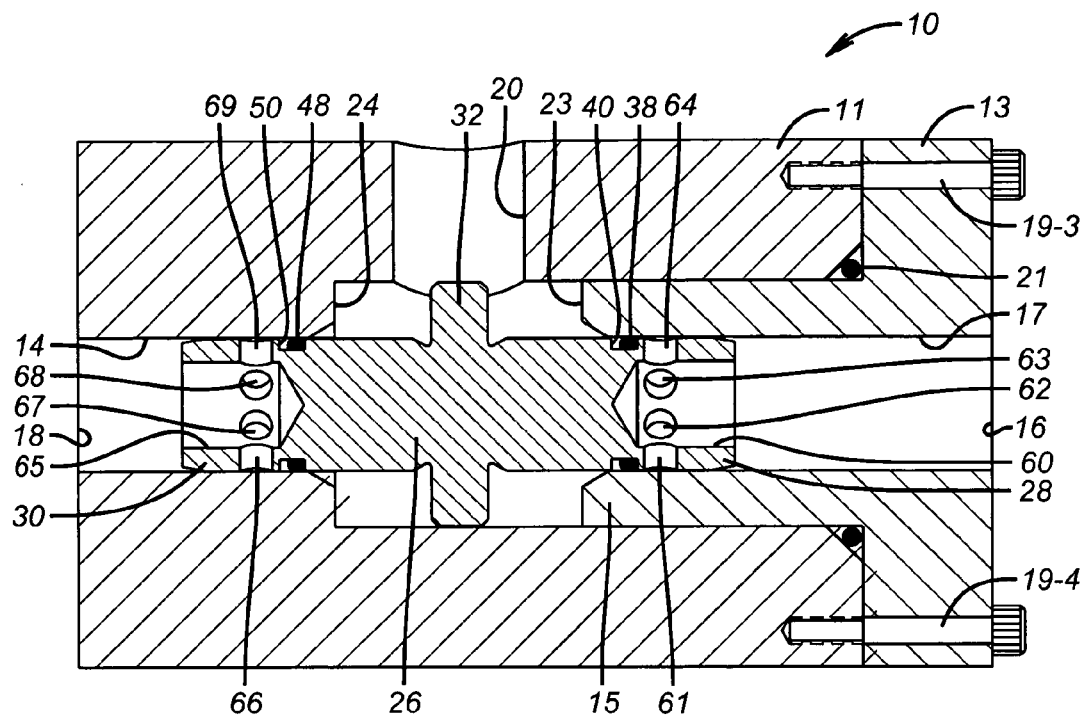
FIG. 5 is a schematic side sectional view of a third exemplary embodiment of the invention, showing a first shuttle position, blocking fluid flow.

Referring to FIG. 5, a variation of the exemplary embodiment of FIG. 1 is depicted, which body 12 is formed of plural pieces 11, 13 sealingly fastened together. Body piece 11 with axial bore 14 matingly accepts male body piece flange 13. The male piece flange 13 including male portion 15 has a central bore 17 that is concentric and coaxial with bore 14 of body piece 11, reducing body bore 14 to a smaller diameter. So reduced, central bore 17 is considered a body bore. Central bore 17 provides the body bore surface on which the first end portion 28 of shuttle 26 axially slideably moves. Male portion 15 forms a terminal shoulder 23 providing the same function as shoulder 22 of the exemplary embodiment of FIG. 1. Fasteners 19-1, 19-2, 19-3, and 19-4 (fasteners 19-1 and 19-2 are not seen in the longitudinal section view of FIG. 5) fasten male piece flange 13 to body piece 11. O-ring seal 21, suitably a buna O-ring seal, provides a seal between female body piece 11 and male body piece flange 13. The other parts of the valve of FIG. 2 are the same as and are corresponding numbered as described for FIG. 1. As in FIG. 1, shuttle 26 is shown in mid-stroke. The exemplary embodiment of FIG. 5 provides the shuttle valve functions as does the exemplary embodiment of FIG. 1, and similarly seals both annulus 44 and annulus 56 and the passages through shuttle bores 60 and 65 when collar 32 does not engage either shoulder 24 or 23.

Figure 6:
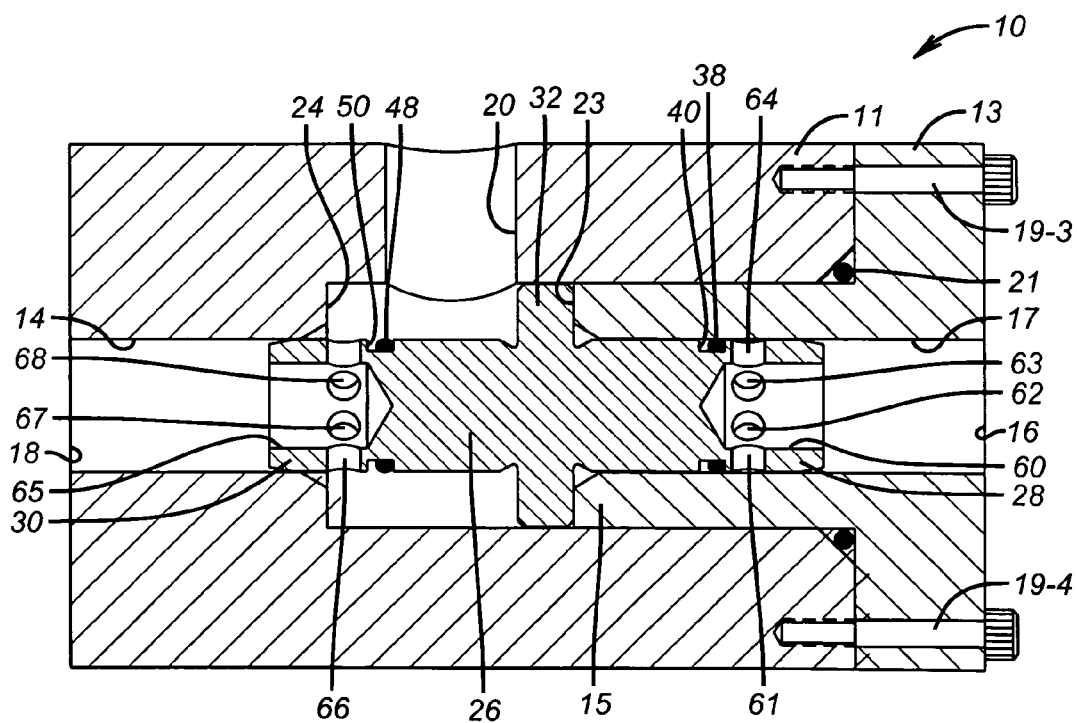
FIG. 6 is a schematic side sectional view of the exemplary embodiment of FIG. 5, showing a second shuttle position, providing flow.

FIG. 6 is the same exemplary embodiment as depicted in FIG. 5 but in FIG. 6 shuttle 26 is shown in the position where collar 32 engages shoulder 23 on the first inlet port side 16 of bore 17 with seal 38 sealing annulus 44 while annulus 54 around shuttle end portion 30 and shuttle bore 65 and passages 66-69 (and two not seen) are not sealed, allowing fluid flow from inlet port 18 to outlet 20.

Figure 7:
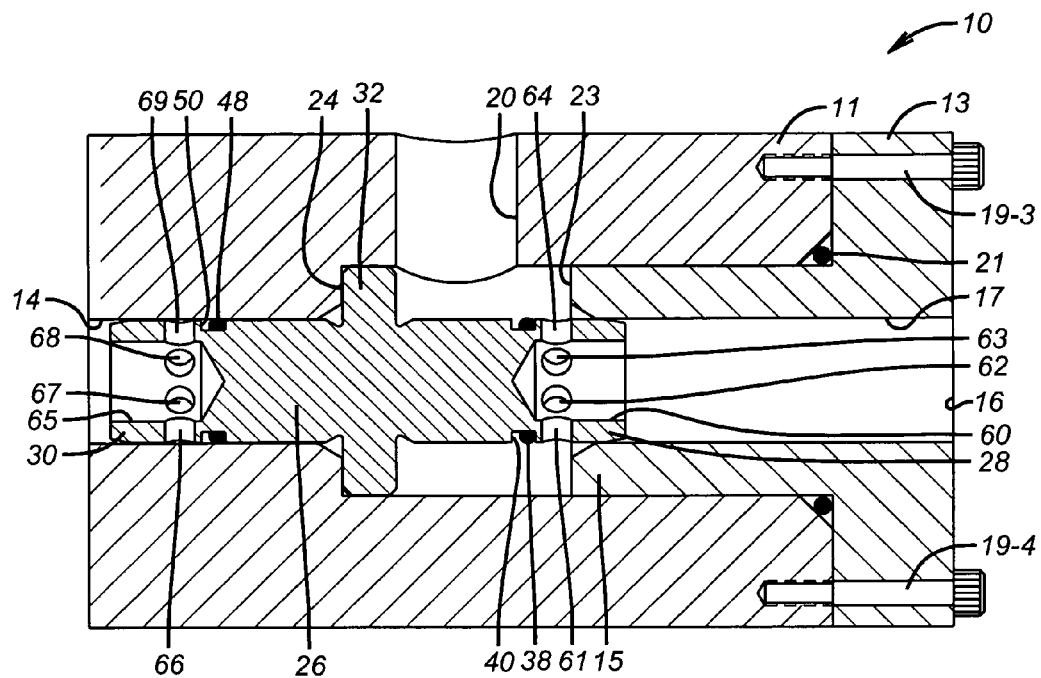
FIG. 7 is a schematic side sectional view of the exemplary embodiment of FIG. 5, showing a third shuttle position, providing flow.

FIG. 7 is the same exemplary embodiment as depicted in FIG. 5 but in FIG. 7 shuttle 26 is shown in the position where collar 32 engages shoulder 24 on the second inlet port side 18 of bore 14 with seal 48 sealing annulus 56 while annulus 44 around shuttle end portion 28 and shuttle bore 60 and passages 61-64 (and two not seen) are not sealed, allowing fluid flow from inlet port 16 to outlet 20.

Figure 8:
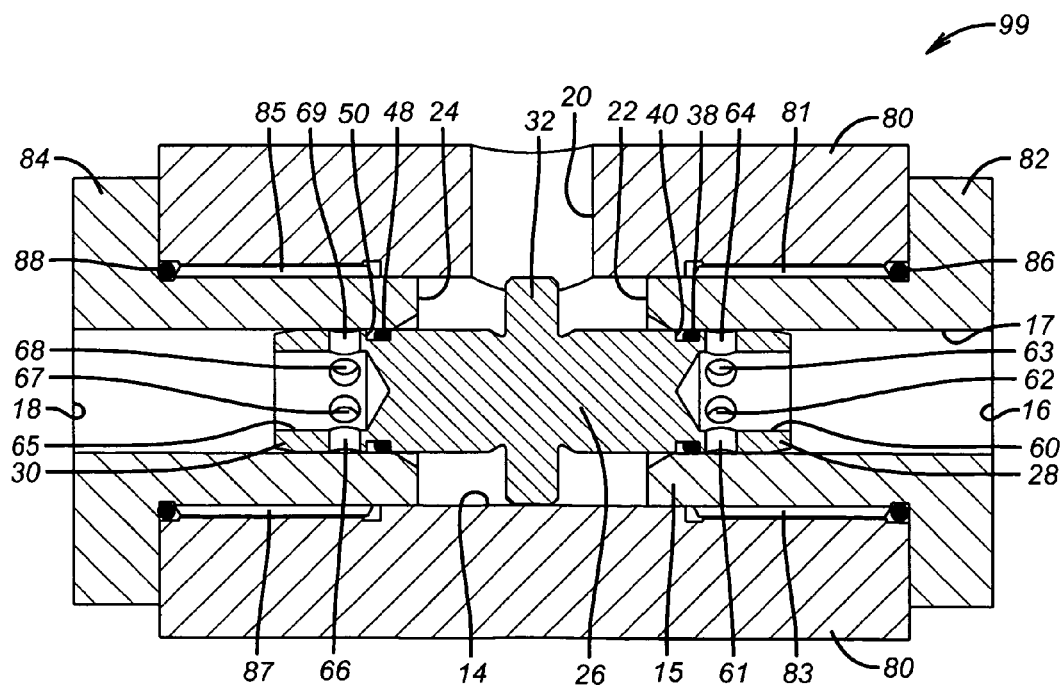
FIG. 8 is a schematic side sectional view of a fourth exemplary embodiment of the invention, showing a first shuttle position, blocking fluid flow.

FIG. 8 depicts another exemplary embodiment using the same shuttle configuration as in the exemplary embodiment of FIG. 1 except the shuttle is carried in a valve body 80 that forms outlet 20, first inlet port 16 is in a first adapter 82 that threadingly engages valve body 80, as at 81, 83, in valve body bore 14 and second inlet port 18 is in a second adapter 84 that threadingly engages valve body 10, as at 85, 87, in valve body bore 14. Inlet ports 16 and 18 of respective adapters 82, 84 are located on opposite sides of transverse outlet 20 of valve body 80 and form a spaced reduced bore 17 concentric and coaxial to body bore 14. So reduced, central bore 17 is considered a body bore. O-ring seal 86, suitably a buna O-ring seal, provides a seal between valve body piece 80 and adapter 82. O-ring seal 88, also suitably a buna O-ring seal, provides a seal between valve body piece 80 and adapter 84. The other parts of the valve of FIG. 8 are the same as and are corresponding numbered as described for FIG. 1. FIG. 8 depicts valve in mid-stroke, where collar 32 does not engage either shoulder 22 or 24 and both annulus 44 and annulus 56 are sealed.

Figure 9:
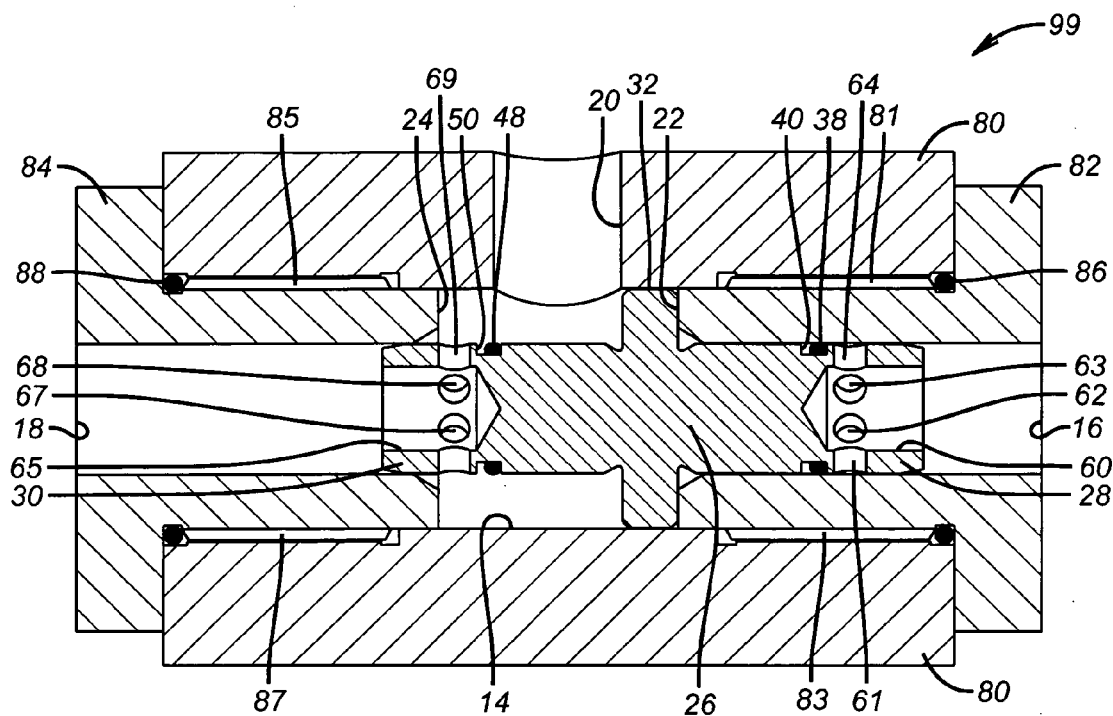
FIG. 9 is a schematic side sectional view of the exemplary embodiment of FIG. 8, showing a second shuttle position, providing flow.

FIG. 9 is the same exemplary embodiment as depicted in FIG. 8 but in FIG. 9 shuttle 26 is shown in the position where collar 32 engages shoulder 22 on the first inlet port side 16 of bore 17 with seal 38 sealing annulus 44 while annulus 56 around shuttle end portion 30 and shuttle bore 65 and passages 66-69 (and two not seen) are not sealed, allowing fluid flow from inlet port 18 to outlet 20.

Figure 10:
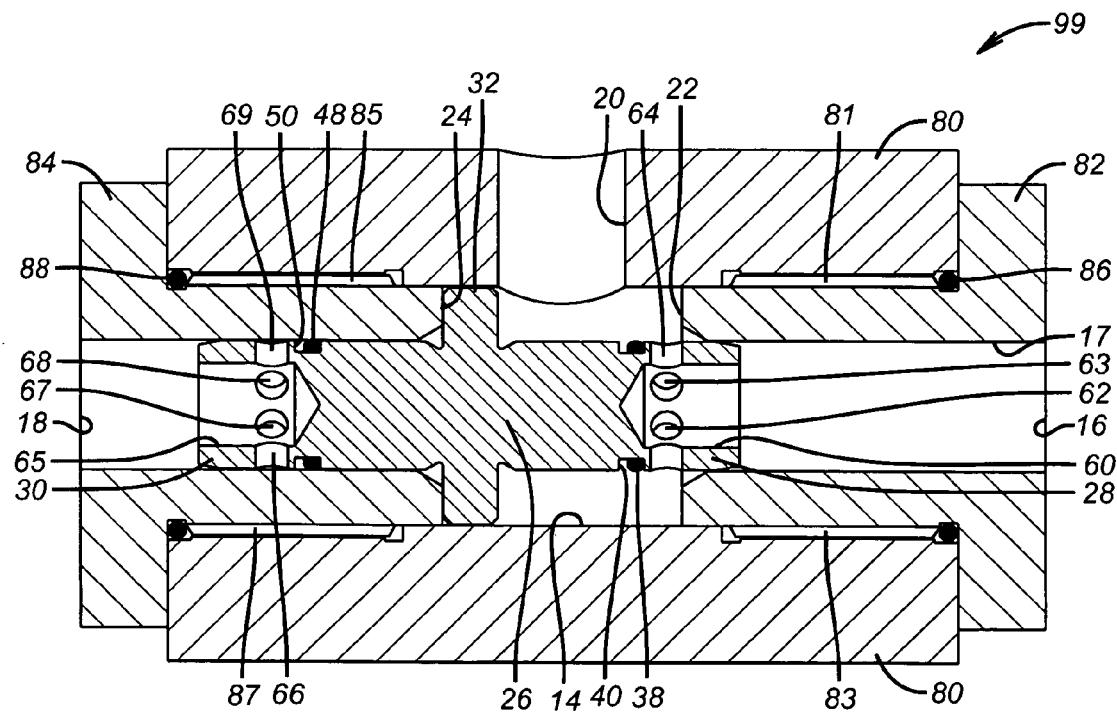
FIG. 10 is a schematic side sectional view of the exemplary embodiment of FIG. 8, showing a third shuttle position, providing flow.

FIG. 10 is the same exemplary embodiment as depicted in FIG. 8 but in FIG. 10 shuttle 26 is shown in the position where collar 32 engages shoulder 24 on the second inlet port side 18 of bore 17 with seal 48 sealing annulus 56 while annulus 44 around shuttle end portion 28 and shuttle bore 60 and passages 61-64 (and two not seen) are not sealed, allowing fluid flow from inlet port 16 to outlet 20.

Figure 11:
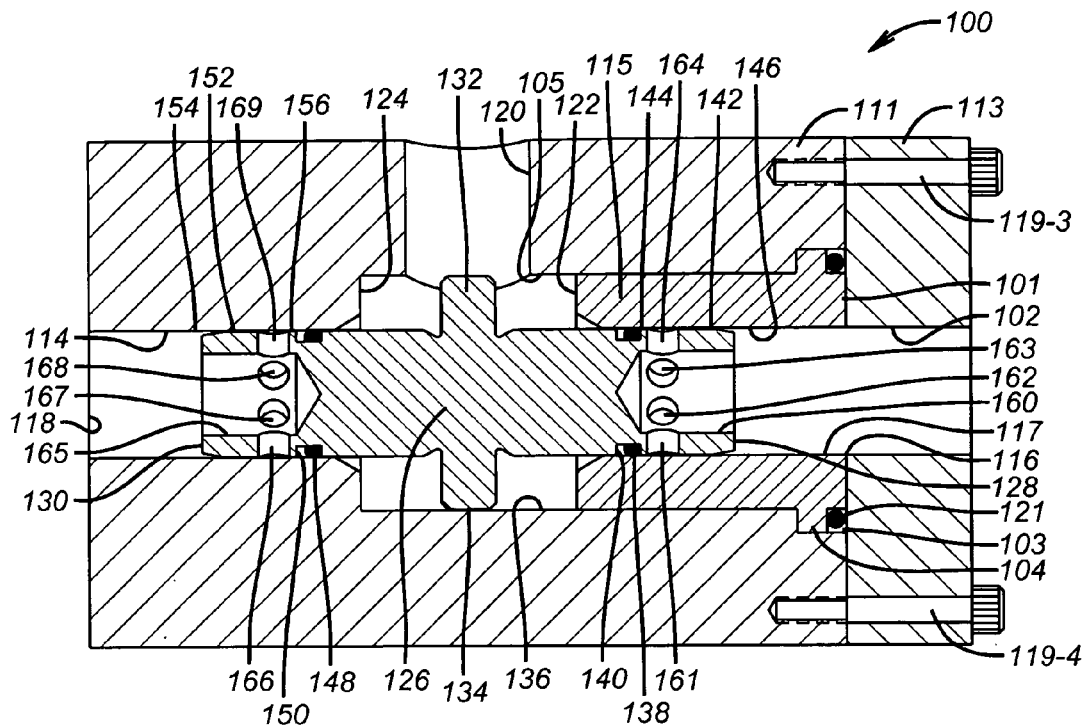
FIG. 11 is a schematic side sectional view of a fifth exemplary embodiment of the invention, showing a first shuttle position, blocking fluid flow.

FIG. 11 depicts another exemplary embodiment generally indicated by reference number 100. In the exemplary embodiment of FIG. 11, the male portion 15 of body piece flange 13 in the exemplary embodiment of FIGS. 5-7 is replaced by an adapter 115 that has an axial bore 117 coaxial to bore 14 and inlet port 16. Referring to FIG. 11 in detail, a shuttle valve 100 comprises a body piece 111 and a flange 113. Body piece 111 has an axial bore 114, second fluid flow inlet port 118 to bore 114, and a fluid pressure function outlet 120 from bore 114.

Outlet 120 is between inlet ports 116, 118 and is transverse to bore 114. Body bore 114 widens proximate outlet 120 on the second inlet port 118 side of outlet 120 to form a shoulder 124, and on the side of outlet port distal to the inlet port 118 widens as at 105 to receive adapter 115. Body bore 114 further widens past 105 in the direction opposite inlet port 118 to form recess 103. Adapter 115 is received in widened bore 114. Adapter 115 has opposite first and second ends 101, 122. First end 101 has a flange 104 on its periphery engaging recess 103. An axial bore 117 runs between ends 101, 122 coaxially to bore 114. Flange 113 has a bore 102 coaxial with adapter axial bore 117. The margin between bore 102 and adapter bore 117 defines inlet port 116 in adapter first end 101 coaxial with body bore 114.

Flange 113 is sealingly fastened to body 111 by fasteners 119-1, 119-2, 119-3 and 119-4 (fasteners 119-1 and 119-2 are not seen in the longitudinal section view of FIG. 11). A seal 121, suitably a buna O-ring seal, in recess 103, engages and seals flange 104 of first end 101 of adapter 115 to body pieces 111 and 113. Adapter second end 122 provides a shoulder on the first inlet port side 116 of outlet 120.

A shuttle 126 coaxial with body bore 114 and adapter bore 117 has first and second cylindrical end portions, respectively 128, 130. Shuttle first end portion 128 extends in the direction of the first inlet port 116, and is coaxially slideably movable along adapter bore 117. Shuttle second end portion 130 extends in the direction opposite first end portion 128 and is coaxially slideably moveable along body bore 114. A collar 132 between first end portion 128 and second end portion 130 of shuttle 126 has an outer cylindrical surface 134 of diameter receivable within the widened body bore as at 105 and has a greater diameter than the end portions 128, 130 of shuttle 126, adapter bore 117 and body bore 114 in which end portions 128, 130 respectively slideably move. Shuttle 126 may move from one shoulder to the other shoulder, such that when collar 132 engages first inlet port side shoulder 122, collar 132 does not engage second inlet port side shoulder 124, and when collar 132 engages second inlet port side shoulder 124, collar 132 does not engage first inlet port side shoulder 122. In the exemplary embodiment depicted in FIG. 11, a first seal 138, suitably a Teflon O-ring seal, is fixed located in seal groove 140 on the outer periphery 142 of first end portion 128 of shuttle 126 for sealing an annulus 144 between that outer periphery 142 and the inner periphery 146 of adapter bore 117 on first inlet port 116 side of bore 117 when collar 132 engages first inlet port side shoulder 122. A second seal 148, suitably a Teflon O-ring seal, is fixed by seal groove 150 on outer periphery 152 of shuttle second end portion 130 for sealing an annulus 156 between outer periphery 152 of the shuttle second end portion 130 and inner periphery 154 of bore 114 on second inlet port 118 side when collar 132 engages second inlet port side shoulder 124. First and second end portions 128, 130 each extend a sufficient distance from collar 132 relative to the placement of seals 138 and 148 that (i) when collar 132 engages first inlet port side shoulder 122, annulus 156 is not sealed, (ii) when collar 132 engages second inlet port side shoulder 124, annulus 144 is not sealed, and (iii) when collar 132 does not engage and is distally spaced from both shoulder 122 and 124, both annulus 144 and annulus 156 are sealed. FIG. 11 depicts valve 100 in mid-stroke, where collar 132 does not engage either shoulder 122 or 124 and both annulus 144 and annulus 156 are sealed.

In the exemplary embodiment of FIG. 11, end portions 128, 130 of shuttle 126 have a central bore 160, 165 respectively, and in each central bore have at least one passage connecting the central bore to periphery 142 or 152 of shuttle 126. In the exemplary embodiment, a plurality of fluid passages 161, 162, 163, 164 (and suitably two others not seen in this view) radiate from bore 160 and a plurality of passages 166, 167, 168 and 169 (and suitably two others not seen in this view) radiate from central bore 165. Seal 138 is fixed on end portion 128 between collar 132 and the passages 161, 162, 163 and 164 radiating from central bore 160. Seal 148 is fixed on end portion 130 between collar 132 and the passages 166, 167, 168 and 169 radiating from central bore 165.

Figure 12:
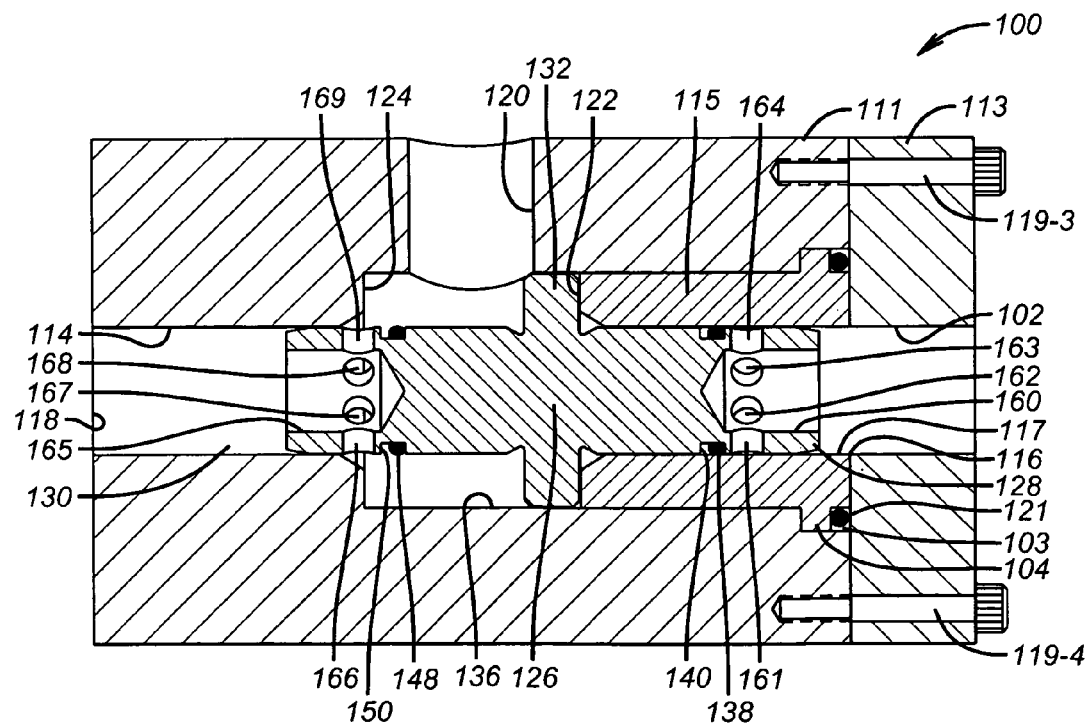
FIG. 12 is a schematic side sectional view of the exemplary embodiment of FIG. 11, showing a second shuttle position, providing flow.

Referring to FIG. 12, when collar 132 engages shoulder 122 on the side of first inlet port 116 of bore 117, annulus 156 is not sealed and fluid flows through bore 165 thence through passages 166, 167, 168, and 169 (and two others not seen) into widened bore 114 to and out outlet 120. Or if pressure in fluid pressure function outlet 120 exceeds pressure in inlet port 118, fluid flows from outlet 120 through passages 166-169 (and two others not seen) through bore 165 into inlet port 118 of bore 114.

Figure 13:
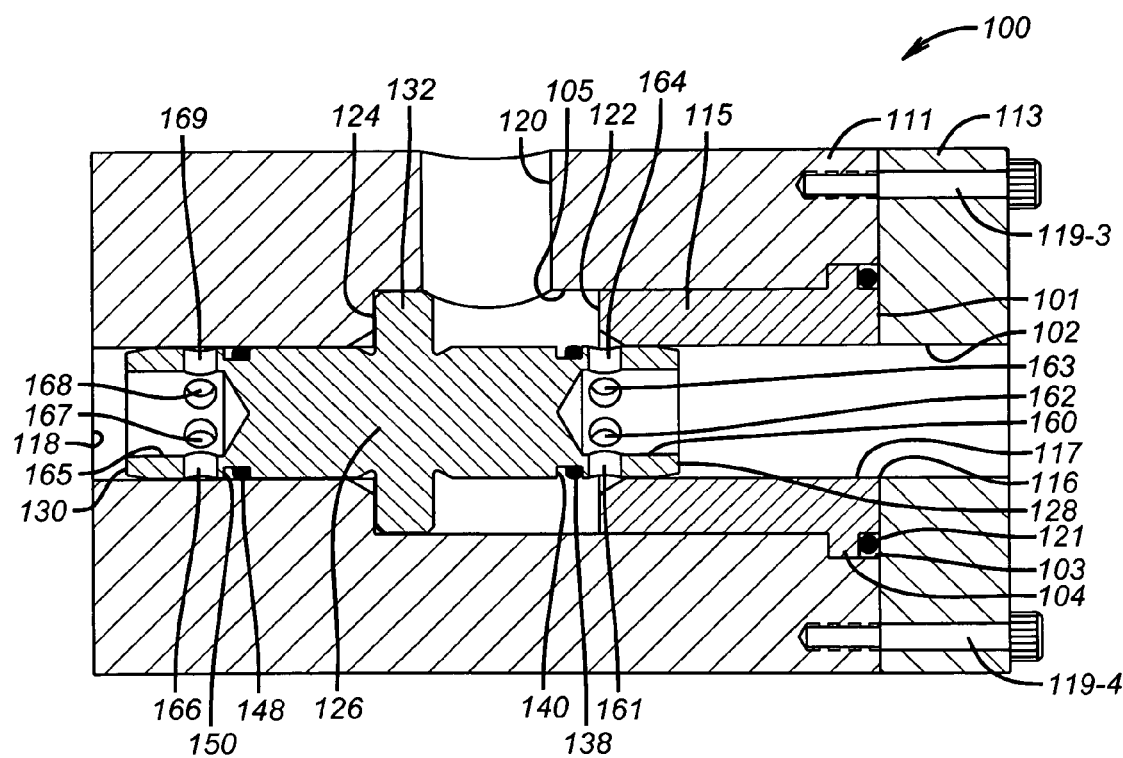
FIG. 13 is a schematic side sectional view of the exemplary embodiment of FIG. 11, showing a third shuttle position, providing flow.

In FIG. 13, conversely to FIG. 12, when collar 132 engages shoulder 124 on the side of second inlet port 118 of bore 114, as depicted in FIG. 13, annulus 144 is not sealed, and fluid flows through bore 160 thence through passages 161, 162, 163, and 164 (and two others not seen) into widened bore 114 to and out outlet 120. Or if pressure in fluid pressure function outlet 120 exceeds pressure in inlet port 116, fluid flows from outlet 120 through passages 161-164 (and two others not seen) through bore 160 into inlet port 116 of bore 114.

Figure 14:
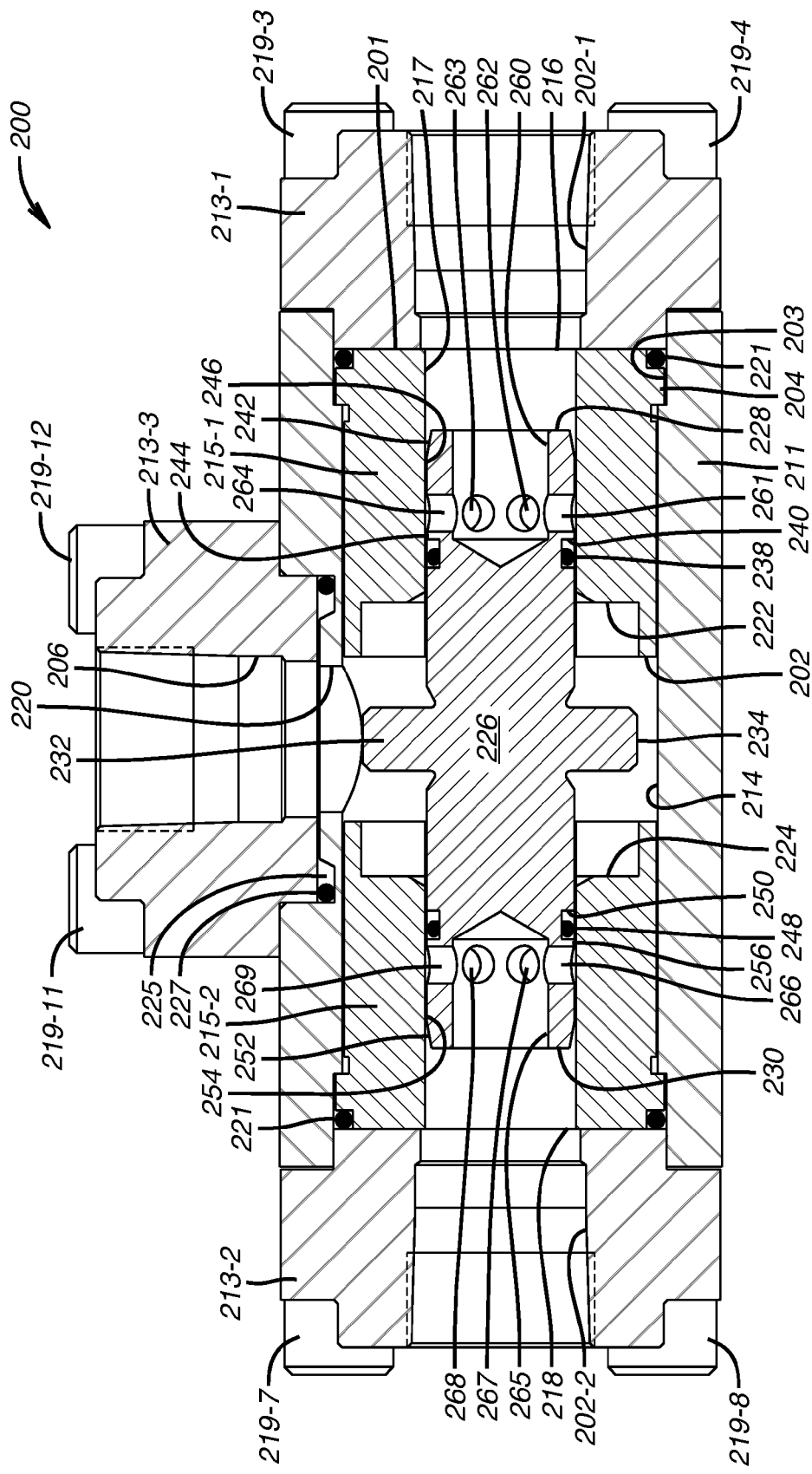
FIG. 14 is a schematic side sectional view of a sixth exemplary embodiment of the invention, showing a first shuttle position, blocking fluid flow.
Figure 15:
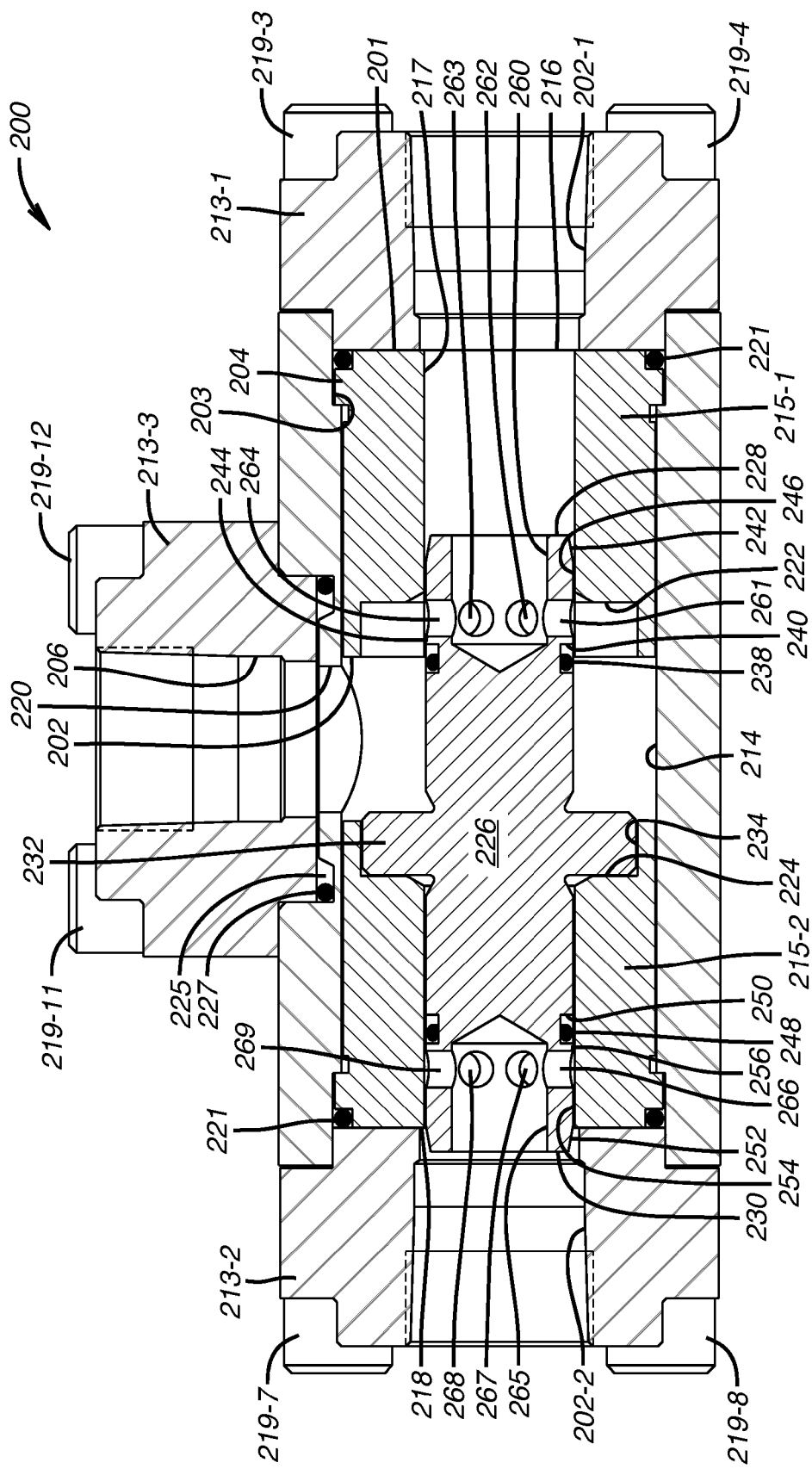
FIG. 15 is a schematic side sectional view of an exemplary embodiment of FIG. 14, showing a second shuttle position, providing flow.

FIGS. 14 and 15 depict another exemplary embodiment. FIG. 14 shows this exemplary embodiment in mid-stroke position of the shuttle and FIG. 15 shows the shuttle disposed against a shoulder. This exemplary embodiment uses two adapters 215-1 and 215-2 to support the shuttle 26 described for the exemplary embodiments of FIGS. 1, 5, 8 and 11, rather than one adapter as in the exemplary embodiment of FIG. 11. The two adapters 215-1 and 215-2 are identical so the description of one, referred to as 215, will be understood as applying to both. Referring to FIG. 14 in detail, a shuttle valve 200 comprises a body piece 211 with an axial bore 214 to which two inlet flanges 213-1 and 213-2 and one outlet flange 213-3 are sealingly fastened by respectively by fasteners 219-1, 219-2, 219-3 and 219-4 (fasteners 219-1 and 219-2 are not seen in the longitudinal section view of FIG. 14), 219-5, 219-6, 219-7, 219-8 (fasteners 219-5 and 219-6 are not seen in the longitudinal section view of FIGS. 14) and 219-9, 219-10, 219-11, and 219-12 (fasteners 219-9 and 219-10 are not seen in the longitudinal section view of FIG. 14). Body piece 211 below flange 213-3 includes a circumferential recess 225. Seal 227, suitably a buna O-ring seal, in recess 225, engages and seals flange 213-3 to body piece 211. Flanges 213-1 and 213-2 have inlet bores, respectively 202-1 and 202-2 coaxial to body bore 214. Bore 214 receives adapter 215. Adapter 215 has opposite first and second ends 201, 202. An axial bore 217 runs between ends 201, 202 coaxially to bore 214 and inlet bores 202-1 and 202-2, respectively, of flanges 213-1 and 213-2. The margin between adapter bore 217 at end 201 of adapter 215-1 and flange bore 202-1 defines first inlet port 216. The margin between adapter bore 217 at end 201 of adapter 215-2 and bore 202-2 defines second inlet port 218. First inlet port 216 is coaxial with bore 214, as is second inlet port 218. Body 211 has a fluid pressure function outlet bore 220 between inlet ports 216, 218 transverse to bore 214. Flange 213-3 has a bore 206 coaxially aligned with transverse bore 220 (alternatively, it could be aligned at an offset or could be a 90 degree flange). Adapter bore 217 widens at the end 202 distal from inlets 202-1 and 202-2 to form a shoulder. In adapter 215-1, the shoulder is identified by reference numeral 222. In adapter 215-2, the shoulder is identified by reference numeral 224. Bore 214 widens proximate inlets 202 and 206 to form recess 203. Adapter 215 first end 201 has a flange 204 on its periphery engaging recess 203. A seal 221, suitably a buna O-ring seal, in recess 203, engages and seals flange 204 of first end 201 of adapter 215 to body piece 211 and flanges 213-1 and 213-2.

A shuttle 226 coaxial with body bore 214 and adapter bore 217 has first and second cylindrical end portions, respectively 228, 230. Shuttle 226 first end portion 228 extends in the direction of the first inlet port 216, and is coaxially slideably movable along adapter bore 217. Shuttle second end portion 230 extends in the direction opposite first end portion 228 and is also coaxially slideably moveable along adapter bore 217. A collar 232 between first end portion 228 and second end portion 230 of shuttle 226 has an outer cylindrical surface 234 of diameter receivable within the widened adapter bore as at 202 and has a greater diameter than the end portions 228, 230 of shuttle 226 and adapter bore 217 in which end portions 228, 230 respectively slideably move. Shuttle 226 may move from one shoulder to the other shoulder, such that when collar 232 engages first inlet port side shoulder 222, collar 232 does not engage second inlet port side shoulder 224, and when collar 232 engages second inlet port side shoulder 224, collar 232 does not engage first inlet port side shoulder 222. In the exemplary embodiment depicted in FIG. 14 a first seal 238, suitably a Teflon O-ring seal, is fixed located in seal groove 240 on the outer periphery 242 of first end portion 228 of shuttle 226 for sealing an annulus 244 between that outer periphery 242 and the inner periphery 246 of adapter bore 217 on first inlet port 216 side of bore 217 when collar 232 engages first inlet port side shoulder 222. A second seal 248, suitably a Teflon O-ring seal, is fixed by seal groove 250 on outer periphery 252 of shuttle second end portion 230 254 of adapter bore 117 on second inlet port 218 side, for sealing an annulus 256 between outer periphery 252 of the shuttle second end portion 230 and inner periphery 254 of adapter bore 217 on second inlet port 218 side when collar 232 engages second inlet port side shoulder 224. First and second end portions 228, 230 each extend a sufficient distance from collar 232 relative to the placement of seals 238 and 248 that (i) when collar 232 engages first inlet port side shoulder 222, annulus 256 is not sealed, (ii) when collar 232 engages second inlet port side shoulder 224, annulus 244 is not sealed, and (iii) when collar 232 does not engage and is distally spaced from both shoulder 222 and 224, both annulus 244 and annulus 256 are sealed. FIG. 14 depicts valve 200 in mid-stroke, where collar 232 does not engage either shoulder 222 or 224 and both annulus 244 and annulus 256 are sealed.

In the exemplary embodiment of FIG. 14, end portions 228, 230 of shuttle 226 have a central bore 260, 265 respectively, and in each central bore have at least one passage connecting the central bore to periphery 252 or 242 of shuttle 226. In the exemplary embodiment, a plurality of fluid passages 261, 262, 263, 264 (and suitably two others not seen in this view) radiate from bore 260 and a plurality of passages 266, 267, 268 and 269 (and suitably two others not seen in this view) radiate from central bore 265. Seal 238 is fixed on end portion 228 between collar 232 and the passages 261, 262, 263 and 264 radiating from central bore 260. Seal 248 is fixed on end portion 230 between collar 232 and the passages 266, 267, 268 and 269 radiating from central bore 265.

Referring to FIG. 15, when collar 232 engages shoulder 224 on the side of second inlet port 218 of adapter bore 217, annulus 244 is not sealed, and fluid flows through bore 260 thence through passages 261, 262, 263, and 264 (and two others not seen) into widened bore 214 to and out outlet 220. Or if pressure in fluid pressure function outlet 220 exceeds pressure in inlet port 216, fluid flows from outlet 220 through passages 261-264 (and two others not seen) through bore 261 into inlet port 216 of bore 214.

Although not depicted, it will be appreciated from the preceding descriptions of other exemplary embodiments, that when collar 232 engages shoulder 222 on the side of first inlet port 216 of adapter bore 217, annulus 256 is not sealed and fluid flows through bore 265 thence through passages 266, 267, 268, and 269 (and two others not seen) into widened bore 214 to and out outlet 220. Or if pressure in fluid pressure function outlet 220 exceeds pressure in inlet port 218, fluid flows from outlet 220 through passages 266-269 (and two others not seen) through bore 265 into inlet port 218 of adapter bore 217.

Figure 16:
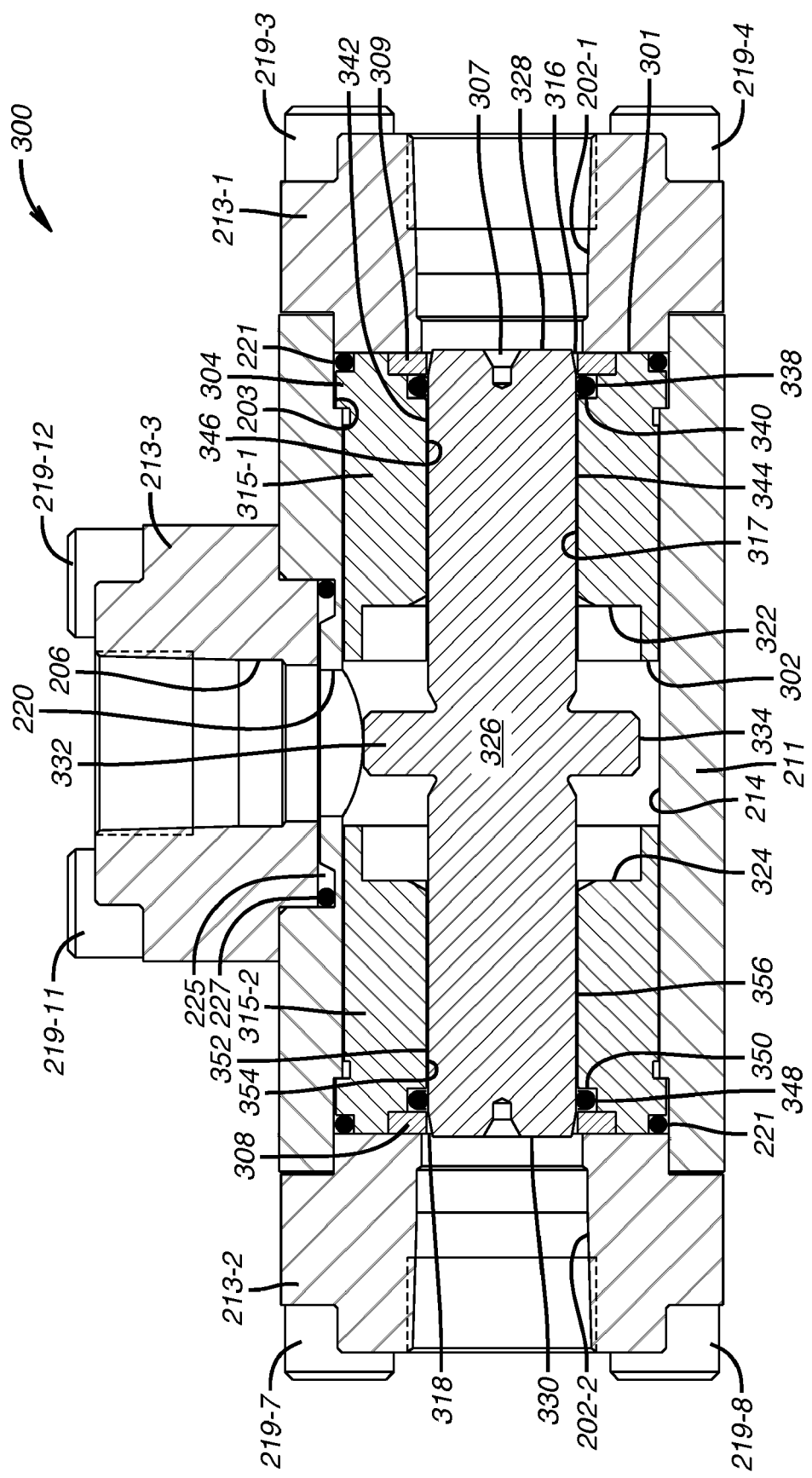
FIG. 16 is a schematic side sectional view of a sixth exemplary embodiment of the invention, showing a first shuttle position, blocking fluid flow.
Figure 17:
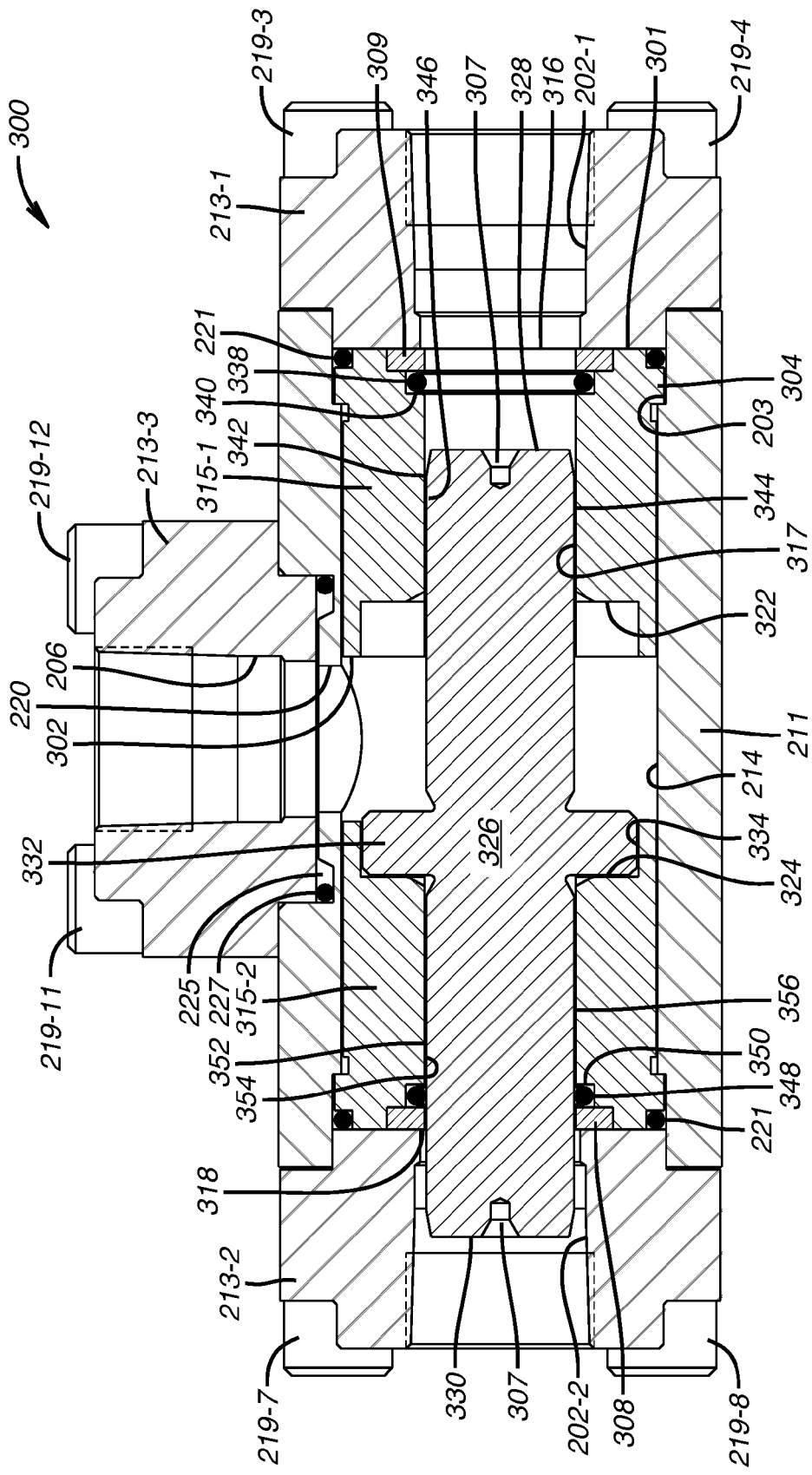
FIG. 17 is a schematic side sectional view of the exemplary embodiment of FIG. 16, showing a second shuttle position, providing flow.

FIGS. 16 and 17 depict another exemplary embodiment, valve 300, using two adapters, FIG. 16 showing the shuttle in mid-stroke and FIG. 17 showing the shuttle at end-stroke. Like numbers as used in the dual adapter exemplary embodiment of FIGS. 14 and 15 will be used for constancy of description, the like numbered parts acting as they do in the exemplary embodiments of FIGS. 14 and 15. Differing from the exemplary embodiment in FIGS. 14 and 15 are the shuttle and the adapters in this exemplary embodiment, carrying a 300 numbering series, which is carried forward into descriptions in following exemplary embodiments. FIGS. 16 and 17 do not depict structure that is present in adapters 315 and reference is made to FIGS. 18-22 for a description of the adapter flow passages hidden in FIGS. 16 and 17. Shuttle 326 drilled, tapped and internally threaded as at 307 on end portions 328 and 330 is coaxially slidably moveable on adapter bore 317 of adapters 315-1 and 315-2 as in the exemplary embodiment of FIGS. 14 and 14, but in this exemplary embodiment, seal 338 is fixed in seal recess 340 on the inner periphery of the adapter bore 317. The two adapters 315-1 and 315-2 are identical so the description of one, referred to as 315, will be understood as applying to both. Referring to FIG. 16 in detail, a shuttle valve 300 comprises a body piece 211 with an axial bore 214 to which to two inlet flanges 213-1 and 213-2 and one outlet flange 213-3 are sealingly fastened respectively by fasteners 219-1, 219-2, 219-3 and 219-4 (fasteners 219-1 and 219-2 are not seen in the longitudinal section view of FIG. 14), 219-5, 219-6, 219-7, 219-8 (fasteners 219-5 and 219-6 are not seen in the longitudinal section view of FIG. 14) and 219-9, 219-10, 219-11, and 219-12 (fasteners 219-9 and 219-10 are not seen in the longitudinal section view of FIG. 14). Flanges 213-1 and 213-2 have inlet bores, respectively 202-1 and 202-2 coaxial to body bore 214. Body bore 214 receives adapter 315. Adapter 315 has opposite first and second ends 301, 302. An axial bore 317 runs between ends 301, 302 coaxially to bore 214 and inlet bores 202-1 and 202-2, respectively, of flanges 213-1 and 213-2. The margin between adapter bore 317 at end 301 of adapter 215-1 and flange bore 202-1 defines first inlet port 316. The margin between adapter bore 317 at end 301 of adapter 315-2 and bore 202-2 defines second inlet port 318. First inlet port 316 is coaxial with bore 214, as is second inlet port 318. Body 211 has a fluid pressure function outlet bore 220 between inlet ports 316, 318 transverse to bore 214. Flange 213-3 has a bore 206 coaxially aligned with transverse bore 220. Adapter bore 317 widens at the end 302 distal from inlets 202-1 and 202-2 to form a shoulder. In adapter 315-1, the shoulder is identified by reference numeral 322. In adapter 315-2, the shoulder is identified by reference numeral 324. Bore 214 widens proximate inlets 202-1 and 202-2 to form recess 203. Adapter first end 301 has a flange 304 on its periphery engaging recess 203. A seal 221, suitably a buna O-ring seal, in recess 203, engages and seals flange 304 of first end 301 of adapter 315 to body piece 211 and flanges 213-1 and 213-2.

A shuttle 326 coaxial with body bore 214 and adapter bore 317 has first and second cylindrical end portions, respectively 328, 330. Shuttle 326 first end portion 328 extends in the direction of the first inlet port 316, and is coaxially slideably movable along adapter bore 317. Shuttle second end portion 330 extends in the direction opposite first end portion 328 and is also coaxially slideably moveable along adapter bore 317. A collar 332 between first end portion 328 and second end portion 330 of shuttle 326 has an outer cylindrical surface 334 of diameter receivable within the widened adapter bore as at 302 and has a greater diameter than the end portions 328, 330 of shuttle 326 and adapter bore 317 in which end portions 328, 330 respectively slideably move. Shuttle 326 may move from one shoulder to the other shoulder, such that when collar 332 engages first inlet port side shoulder 322, collar 332 does not engage second inlet port side shoulder 324, and when collar 332 engages second inlet port side shoulder 324, collar 332 does not engage first inlet port side shoulder 322. In the exemplary embodiment depicted in FIGS. 16 and 17, a first seal 338, suitably a Teflon O-ring seal, is fixed located in seal groove 340 on the inner periphery 346 of adapter bore 317 retained by retainer ring 309 for sealing an annulus 344 between outer periphery 342 of end portion 328 of shuttle 326 and the inner periphery 346 of adapter bore 317 on first inlet port 316 side of bore 317 when collar 332 engages first inlet port side shoulder 322. A second seal 348, suitably a Teflon O-ring seal, is fixed by seal groove 350 on inner periphery 354 of adapter bore 317 retained by retainer ring 308 for sealing an annulus 356 between outer periphery 352 of end portion 330 of shuttle 326 and the inner periphery 354 of adapter bore 317 on second inlet port 318 side of bore 317 when collar 332 engages second inlet port side shoulder 324. First and second end portions 328, 330 each extend a sufficient distance from collar 332 relative to the placement of seals 338 and 348 that (i) when collar 332 engages first inlet port side shoulder 322, annulus 356 is not sealed, (ii) when collar 332 engages second inlet port side shoulder 224, annulus 344 is not sealed, and (iii) when collar 332 does not engage and is distally spaced from both shoulder 322 and 324, both annulus 344 and annulus 356 are sealed. FIG. 16 depicts valve 300 in mid-stroke, where collar 332 does not engage either shoulder 322 or 324 and both annulus 344 and annulus 356 are sealed.

Figure 18:
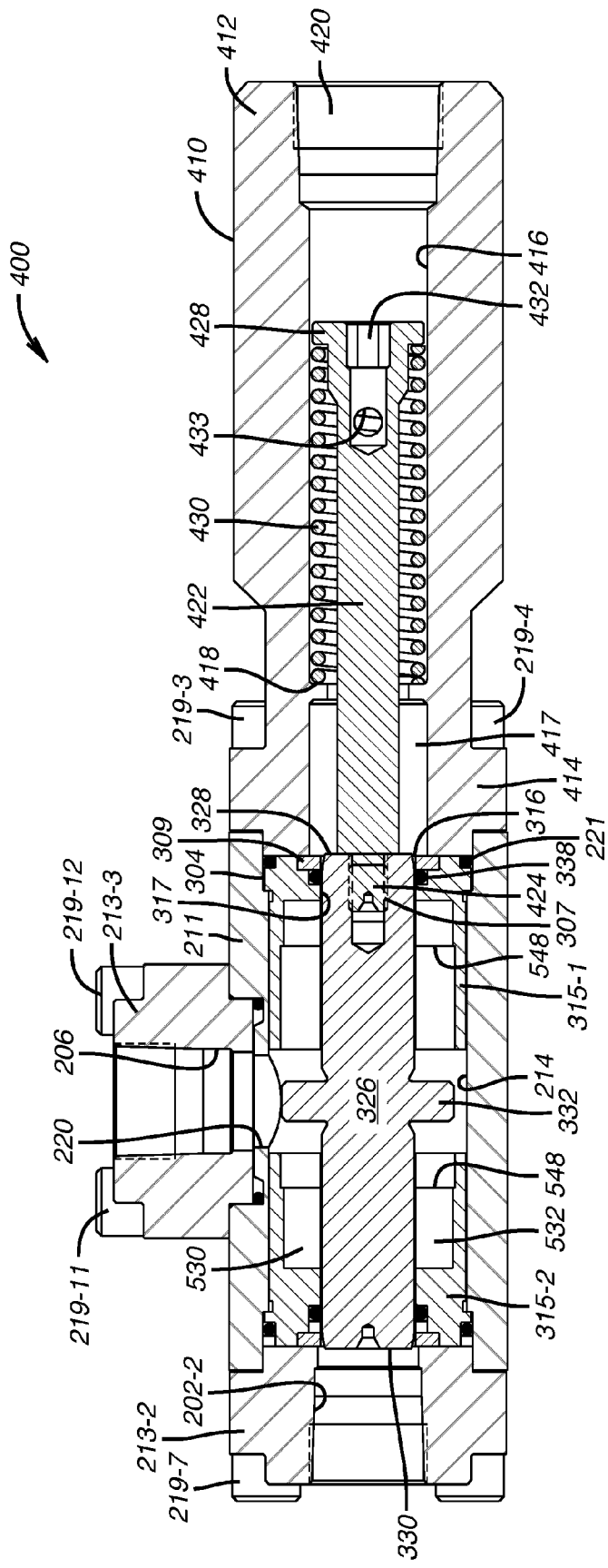
FIG. 18 is a schematic side sectional view of an ROV valve exemplary embodiment of the invention, showing a first shuttle position, blocking fluid flow.
Figure 19:
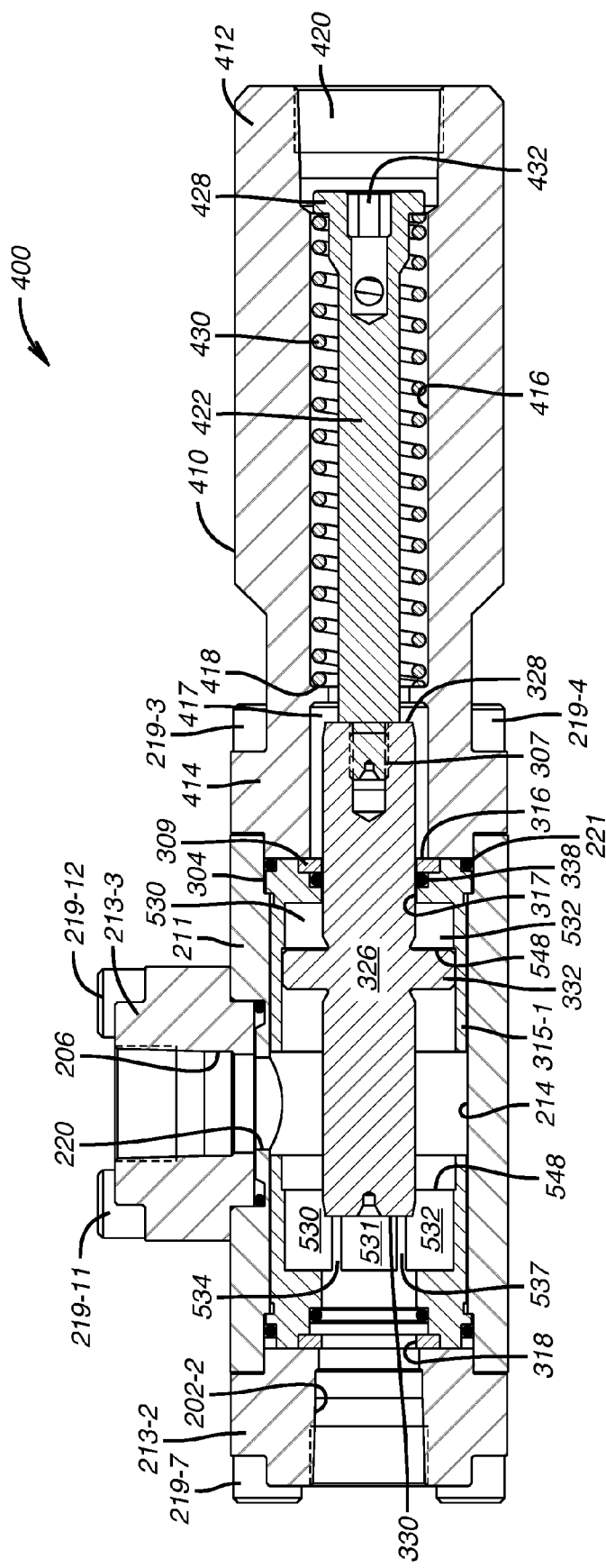
FIG. 19 is a schematic side sectional view of the exemplary embodiment of FIG. 18, showing a second shuttle position, providing flow.
Figure 20:
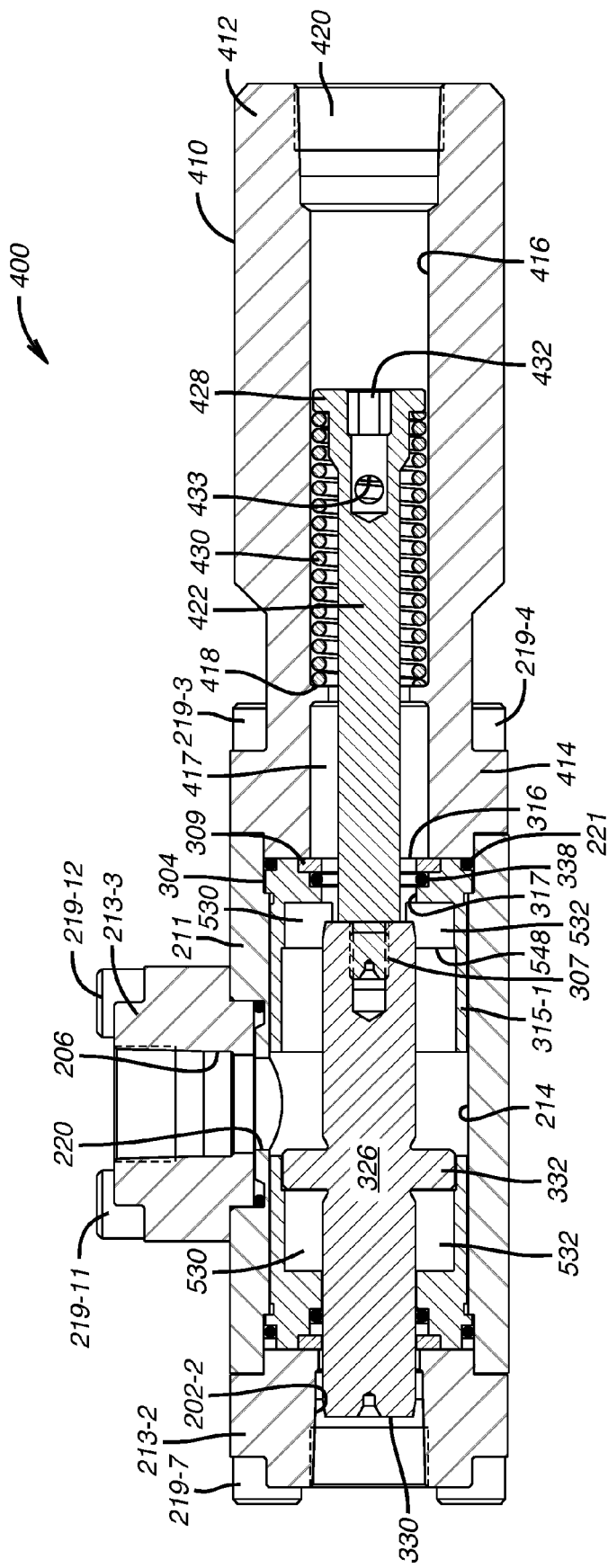
FIG. 20 is a schematic side sectional view of the exemplary embodiment of FIG. 18, showing a third shuttle position, providing flow.

FIGS. 18-20 schematically depict an exemplary embodiment of an ROV valve 400. The exemplary embodiment of FIGS. 18-20 employs the two adapter shuttle valve exemplary embodiment of FIGS. 16-17, and that description is incorporated here at by reference for brevity. In the exemplary embodiment of FIGS. 18-20, end portions 330 and 328 of shuttle 320 are sealed by a seal on the inner periphery of the body bore and the body has at least one passage in fluid communication with the body bore between said seal and the shoulder proximate the seal as described in connection with FIGS. 16-17

Shuttle valve 400 further comprises an elongate tubular housing 410 having first and second end portions 412 and 414, a central bore 416, a spring seat 418 formed in central bore 416 distal from first end portion 412 of housing 410. Second end portion 414 of the housing 410 is sealingly fastened respectively by fasteners 219-1, 219-2, 219-3 and 219-4 (fasteners 219-1 and 219-2 are not seen in the longitudinal section view of FIG. 18) to valve body 211 adjacent first inlet port 316 of valve body 211 with the housing central bore 416 coaxial with body bore 214 and adapter bore 317 and in fluid communication with adapter bore 317. Housing 410 includes an inlet 420 in first end portion 412 of housing 410 in fluid communication with central bore 416. An elongate stem 422 passes through housing 410 and connects on one end 424 to the first end portion 328 of shuttle 326 at threaded tap 307. The other end of stem 422 comprises a spring retainer 428 of diameter allowing stem 422 to coaxially moveably slide in central bore 416 of housing 410 and to allow fluid to flow from housing inlet 420 into central bore 416. An aperture 432, 433 may be provided in stem 422 to aid passage of fluid from inlet 420 into central bore 416. A spring 430 surrounds a portion of stem 422 and is positioned in elongate tubular housing 410 on spring seat 418 and in contact with spring retainer 428. Axial bore 416 continues at 417 in second end 414 on the side of seat 418 distal to spring 430 for fluid communication with first inlet port 316. Spring 430 urges the stem toward housing inlet 420 in response to reduction of fluid pressure in housing inlet 420 or in response to fluid pressure in a portion of the adapter bore 317 and relatedly in body bore 214 in fluid communication with function outlet 220 higher than fluid pressure in housing inlet 420.

In operation, fluid flow from an ROV will start moving shuttle 326 from a position as depicted in FIG. 19 when shuttle collar is against shoulder 322 as filling pressure from fluid passing from inlet 420 through center bore presses against the inlet end 328 of shuttle 326 and passes through adapter 315-1 inlet port 316 and thence through internal grooves within adapter 315-1 (see the description in reference to FIGS. 20-21 for further information on this internal structure of adapter 315-1). At mid-stroke, as depicted in FIG. 18, both inlet ports 316 and 318 are closed. Both ends of the shuttle are sealed with soft seals. Then, as pressure within adapter 315-1 exceeds pressure from inlet 315-2, shuttle 326, as depicted in FIG. 20, will be pressed against shoulder 324 on adapter 315-2 closing off inlet port 318. ROV fluid will fill function outlet and increase pressure until full operating pressure is obtained at the function. At this point the ROV can be blocked out and pressure will be maintained on the function. If there is any slight leakage from the function or the ROV block valve, shuttle 326 will remain seated and inlet port 318 will remain closed. When venting the function, the ROV has complete control of the function pressure as long as the pressure is maintained above the set pressure of the ROV spring (150-300 psi, for example).

Referring to FIGS. 21 and 22, depicted is a shuttle valve of the type disclosed in U.S. Pat. No. 4,253,481, the content of which is incorporated by reference as if set forth herein verbatim. A shuttle valve 500 includes a tubular body 502 having two coaxial inlet ports 504, 506 at its ends and a transverse outlet port 508 at its side. Internally threaded connector rings 509, 510, 511 are secured over each port by cap screws 512, 513, 514, 515, 516 and 517. Two adapter cages 518, 519 having an external radial flange 520, 521 are telescopically disposed within each inlet port 504, 506, with its flange clamped between the adjacent connector ring 510, 511 and an outwardly facing shoulder 522, 523 (not seen) in body 500. O-rings 524, 525, 526 seal the three connector rings 509, 510, 511 and the two cages 518, 519 to the body. Each cage is axially grooved, providing flow passages 530, 531, 532, 533. The ribs left between the grooves provide guide bearings 534, 535, 536, 537. The inner ends of the ribs form stop shoulders 548. A shuttle in the form of a cylindrical plug 540 tapered at each end 542, 544 is axially slideably disposed inside body 500 within cages 518, 519 supported and guided by the rib bearings alternately to engage the stops of one or the other of the cages 518, 519 according to whether the pressure on one end of the shuttle or the other is higher. A collar 546 around the middle of the shuttle provides a piston.

Figure 23:
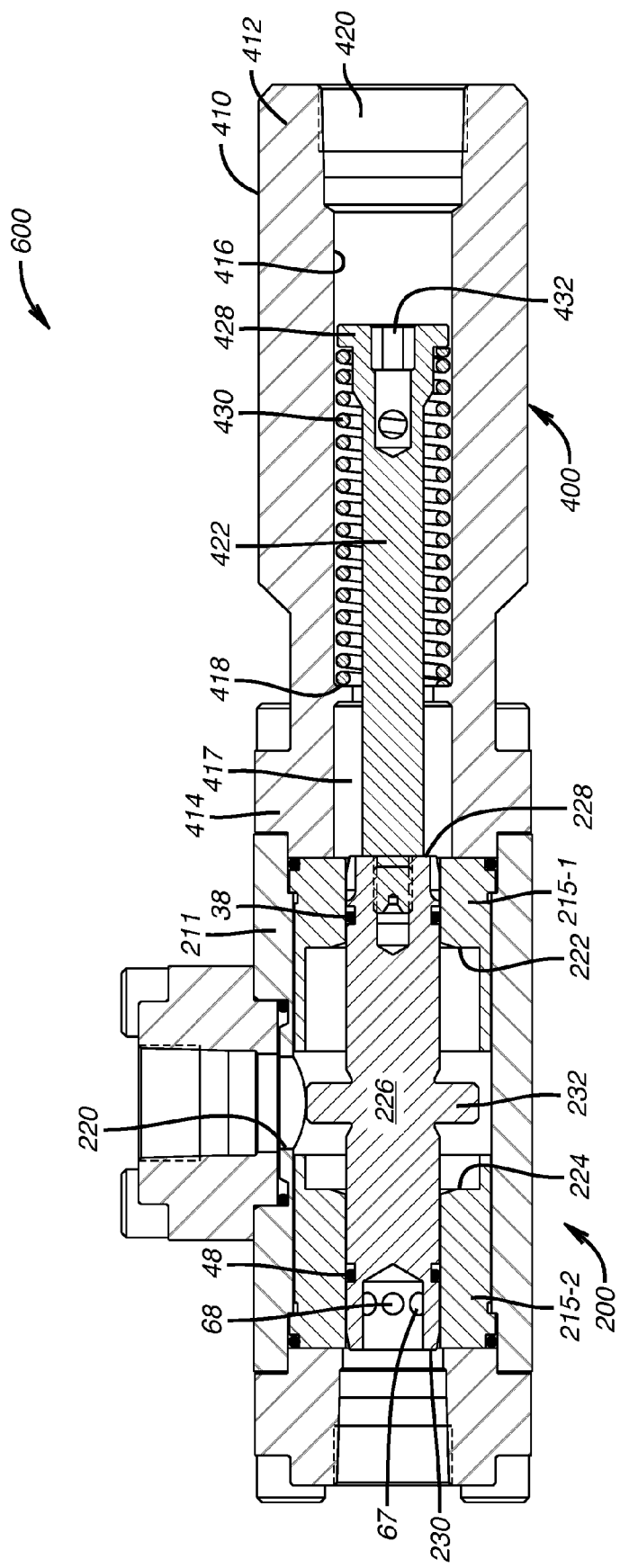
FIG. 23 is a schematic side sectional view of another ROV valve exemplary embodiment of the invention, showing a first shuttle position, blocking fluid flow.
Figure 24:
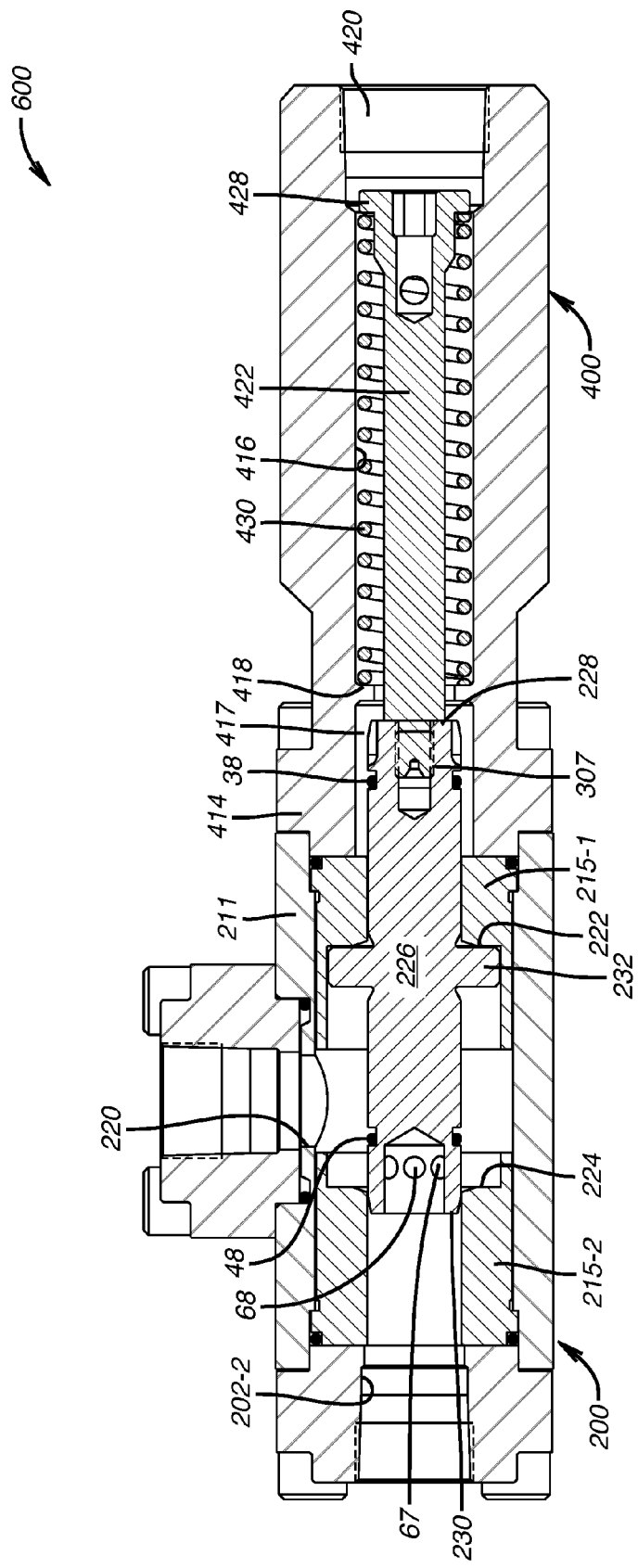
FIG. 24 is a schematic side sectional view of the exemplary embodiment of FIG. 23, showing a second shuttle position, providing flow
Figure 25:
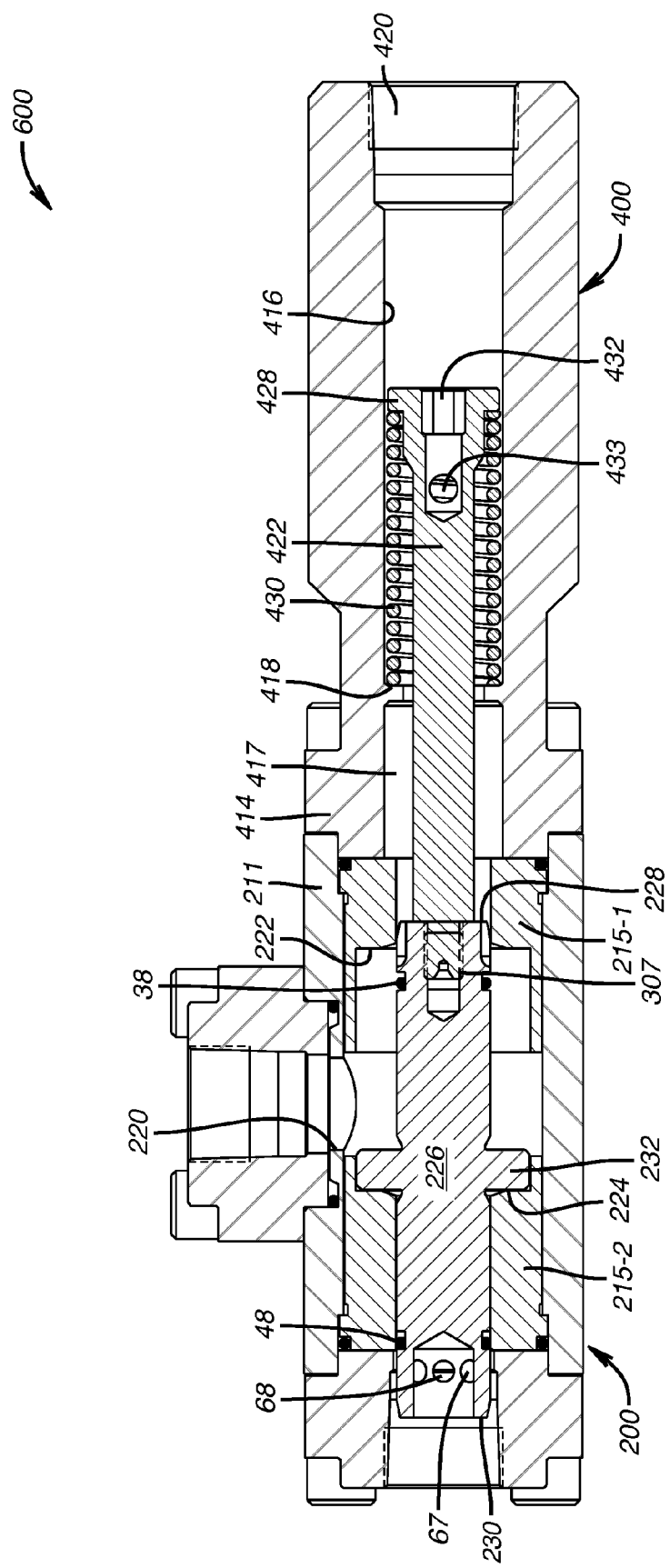
FIG. 25 is a schematic side sectional view of the exemplary embodiment of FIG. 23, showing a third shuttle position, providing flow.

Referring now to FIGS. 23-25, an exemplary embodiment of an ROV valve 600 is depicted assembled with the components of the shuttle valve 200 described in connection with the exemplary embodiment of FIG. 14 and the elongate tubular housing 510 structure described for valve 500. The descriptions of FIG. 14, FIG. 18 and FIGS. 21, 22 are incorporated using the reference numerals for identifications of the components. In valve 600 at least one of end portions 328 and 330 of shuttle 326 has a central bore and at least one fluid passage connecting said bore to the periphery of the shuttle, and the seals are fixed on the end portion 328 and 330 between collar 332 and the passage.

Figure 26:
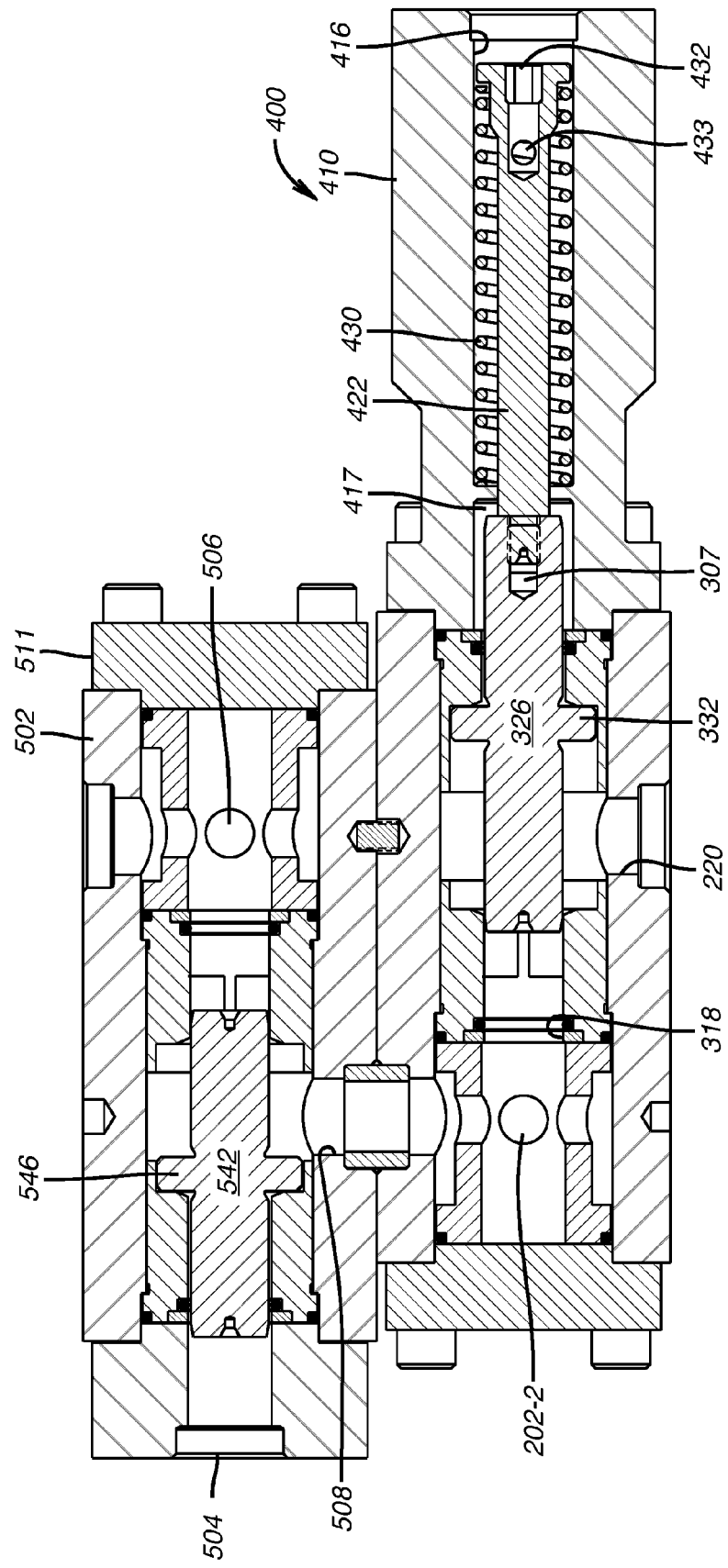
FIG. 26 is a schematic side sectional view showing use of the ROV valve exemplary embodiment of FIG. 23 coupled to a shuttle valve of the type shown in FIG. 21.
Figure 27:
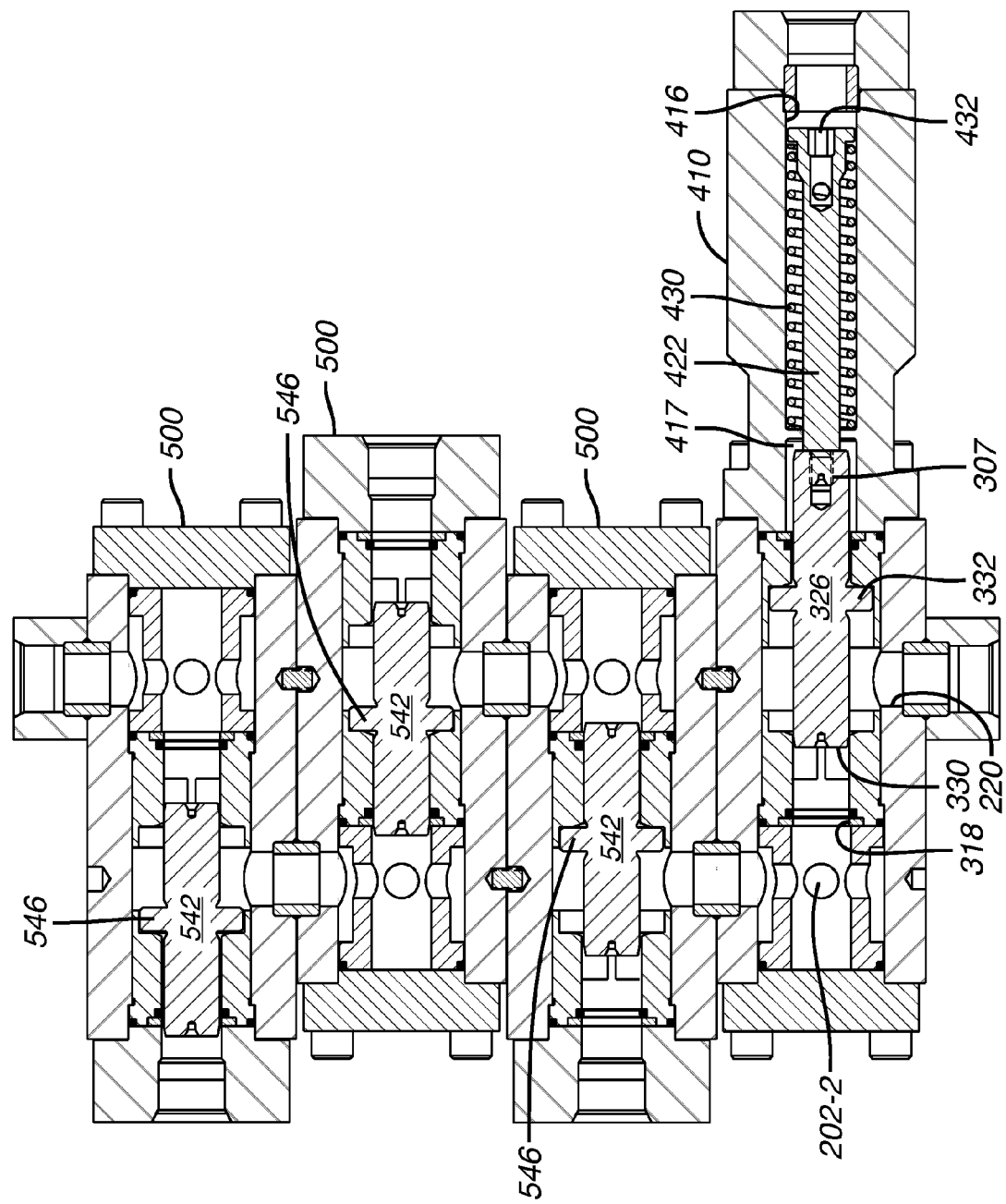
FIG. 27 is a side sectional view showing the ROV exemplary embodiment of FIG. 18 coupled in a gang of shuttle valves of the type shown in FIG. 21.

Referring now to FIGS. 26 and 27, an exemplary embodiment of an ROV valve 400 of FIG. 18 is coupled to shuttle valves of the type shown in FIG. 21 to provide three or more supply ports for redundancy.

The above disclosed subject matter is to be considered illustrative, and not restrictive, and the appended claims are intended to cover all modifications, enhancements, and other embodiments that fall within the true scope of the present invention, which to the maximum extent allowed by law, is to be determined by the broadest permissible interpretation of the following claims and their equivalents, unrestricted or limited by the foregoing detailed descriptions of exemplary embodiments of the invention.

The invention claimed is:

1. A valve comprising:
   a) a body having an axial bore, a pair of first and second fluid flow inlet ports to said bore, and a fluid pressure function outlet from said bore, said outlet being transverse to said bore between said inlet ports, said bore widening proximate said outlet to form shoulders flanking said outlet;
   b) a shuttle coaxial with said bore and having:
      i) first and second cylindrical end portions, said first end portion extending in the direction of the first inlet port of the body and coaxially slideably movable along said axial bore, said second end portion extending in the direction opposite said first end portion and being coaxially slideably moveable along said axial bore,
      ii) a collar between the first and second end portions of the shuttle, said collar having an outer cylindrical surface of diameter receivable within the widened axial bore and of diameter greater than the end portions of the shuttle and the axial bore in which said end portions slideably move,
      iii) said shuttle moving from one shoulder to the other shoulder such that when said collar engages the shoulder on the first inlet port side of the bore, the collar does not engage the shoulder on the second inlet port side of the bore, and when the collar engages the shoulder on the second inlet port side of the axial bore, the collar does not engage the shoulder on the first inlet port side of the bore,
   c) at least one first soft seal fixed on either the outer periphery of said shuttle first end portion or the inner periphery of the axial bore on its first inlet port side, for sealing an annulus between said outer periphery of said shuttle first end portion and the inner periphery of the axial bore on its first inlet port side when said collar engages the shoulder on the first inlet port side of the axial bore,
   d) at least one second soft seal fixed on either the outer periphery of said shuttle second end or the inner periphery of the axial bore on its second inlet port side, for sealing an annulus between said outer periphery of said shuttle second end portion and said inner periphery of said axial bore on its second inlet port side when said collar engages the shoulder on the second inlet port side of the axial bore,
   e) said soft seals being placed sufficiently distally outwardly from said shoulders in the direction of said inlet ports and said end portions extending for a distance from said collar, such that:
      i) when the collar engages the shoulder on the first inlet port side of the axial bore, the annulus between said outer periphery of said shuttle first end portion and said inner periphery of said axial bore on its first inlet port side is sealed, and the annulus between said outer periphery of said shuttle second end portion and said inner periphery of said axial bore on its second inlet port side is not sealed,
      ii) when the collar engages the shoulder on the second inlet port side of the axial bore, the annulus between said outer periphery of said shuttle second end portion and said inner periphery of said axial bore on its second inlet port side is sealed, and the annulus between said outer periphery of said shuttle first end portion and said inner periphery of said axial bore on its first inlet port side is not sealed, and
      iii) when the collar does not engage and is distally spaced from either shoulder, the annulus between said outer periphery of said shuttle first end portion and said inner periphery of said axial bore on its first inlet port side is sealed, and the annulus between said outer periphery of said shuttle second end portion and said inner periphery of said axial bore on its second inlet port side is also sealed.

2. The valve of claim 1 in which at least one of said end portions of said shuttle has a central bore and at least one fluid passage connecting said central bore to the periphery of the shuttle, and in which said at least one said soft seal is fixed on said outer periphery of said at least one end portion between said collar and said at least one passage.

3. The valve of claim 1 in which said body has at least one passage in fluid communication with said axial bore between a said soft seal on the inner periphery of the bore and the shoulder proximate said seal.

4. The valve of claim 1, further comprising
   a) an elongate tubular housing having
      i) first and second end portions,
      ii) a central bore,
      iii) a spring seat formed in said central bore distal from said first end portion of the housing,
      iv) said second end portion of the housing being sealingly fastened to said body adjacent said body's first inlet port with said central bore coaxial with and in fluid communication with said body bore,
      v) an inlet in said first end portion of the housing in fluid communication with said central bore,
   b) an elongate stem passing through said housing and connecting on one end to said first end portion of said shuttle, the other end comprising a spring retainer of diameter allowing said stem to coaxially moveably slide in said central bore of the housing and to allow fluid to flow from said housing inlet into said central bore, and
   c) a spring surrounding a portion of the stem and positioned in the elongate tubular housing on said spring seat and in contact with the spring retainer, said spring urging said stem toward said housing inlet in response to reduction of fluid pressure in said housing inlet or in response to fluid pressure in a portion of said body bore in fluid communication with said outlet higher than fluid pressure in said housing inlet.

5. The valve of claim 4 in which at least one of said end portions of said shuttle has a central bore and at least one fluid passage connecting said shuttle central bore to the periphery of the shuttle, and in which said at least one said soft seal is fixed on said outer periphery of said at least one end portion between said collar and said at least one passage.

6. The valve of claim 4 in which said body has at least one passage in fluid communication with said axial bore between a said soft seal on the inner periphery of the axial bore and the shoulder proximate said seal.

7. The valve of claim 1 in which said body is formed of plural pieces sealingly fastened together.

8. The valve of claim 7 in which at least one of said end portions of said shuttle has a central bore and at least one fluid passage connecting said shuttle central bore to the periphery of the shuttle, and in which said at least one said soft seal is fixed on said outer periphery of said at least one end portion between said collar and said at least one passage.

9. The valve of claim 7 in which said body has at least one passage in fluid communication with said axial bore between a said soft seal on the inner periphery of the axial bore and the shoulder proximate said seal.

10. The valve of claim 7 further comprising
   a) an elongate tubular housing having
      i) first and second end portions,
      ii) a central bore,
      iii) a spring seat formed in said central bore distal from said first end portion of the housing,
      iv) said second end portion of the housing being sealingly fastened to said body adjacent said body's first inlet port with said central bore coaxial with and in fluid communication with said body bore,
      v) an inlet in said first end portion of the housing in fluid communication with said central bore,
   b) an elongate stem passing through said housing and connecting on one end to said first end portion of said shuttle, the other end comprising a spring retainer of diameter allowing said stem to coaxially moveably slide in said central bore of the housing and to allow fluid to flow from said housing inlet into said central bore, and
   c) a spring surrounding a portion of the stem and positioned in the elongate tubular housing on said spring seat and in contact with the spring retainer, said spring urging said stem toward said housing inlet in response to reduction of fluid pressure in said housing inlet or in response to fluid pressure in a portion of said body bore in fluid communication with said outlet higher than fluid pressure in said housing inlet.

11. The valve of claim 10 in which at least one of said end portions of said shuttle has a central bore and at least one fluid passage connecting said shuttle central bore to the periphery of the shuttle, and in which said at least one said soft seal is fixed on said outer periphery of said at least one end portion between said collar and said at least one passage.

12. The valve of claim 10 in which said body has at least one passage in fluid communication with said axial bore between a said soft seal on the inner periphery of the axial bore and the shoulder proximate said seal.

13. A valve comprising:
   a) a body having an axial bore with first and second openings, and a fluid pressure function outlet from said bore, said outlet being transverse to said bore between said openings, said bore widening proximate said outlet on the second opening side of the outlet to form a shoulder adjacent said outlet, and widening on the first opening side of the outlet to receive an adapter,
   b) an adapter received in said widened portion of the bore on the first opening side of the outlet and fastened to and in sealing engagement with said body, said adapter having:
      i) opposite first and second ends, said second end being distal from said first opening and providing a shoulder adjacent said outlet on the first opening side of the outlet, and
      ii) an axial bore between the first and second ends coaxial with said body bore forming a first fluid flow inlet port at said first end;
   c) a shuttle coaxial with said body bore and said adapter bore, and having:
      i) first and second cylindrical end portions, said first end portion extending in the direction of the first inlet port of the body and coaxially slideably movable along said adapter bore, said second end portion extending in the direction opposite said first end portion and being coaxially slideably moveable along said body bore,
      ii) a collar between the first and second end portions of the shuttle, said collar having an outer cylindrical surface of diameter receivable within the widened body bore and of diameter greater than the end portions of the shuttle and the adapter and body bores in which said end portions slideably move,
      iii) said shuttle moving from one shoulder to the other shoulder such that when said collar engages the first inlet port side shoulder, the collar does not engage the second inlet port side shoulder, and when the collar engages the second inlet port side shoulder, the collar does not engage the first inlet port side shoulder,
   d) at least one first soft seal fixed on either the outer periphery of said shuttle first end portion or the inner periphery of the adapter bore on the first inlet port side, for sealing an annulus between said outer periphery of said shuttle first end portion and said inner periphery of said adapter bore on the first inlet port side when said collar engages the first inlet port side shoulder;
   e) at least one second soft seal fixed on either the outer periphery of said shuttle second end or on the inner periphery of the body bore on the second inlet port side of said second inlet port side shoulder, for sealing an annulus between said outer periphery of said shuttle second end portion and said inner periphery of said body bore on its second inlet port side when said collar engages the second inlet port side shoulder;
   f) said soft seals being placed sufficiently distally outward from said shoulders in the direction of said inlet ports and said end portions extending for a distance from said collar such that:
      i) when the collar engages the first inlet port side shoulder, the annulus between said outer periphery of said shuttle first end portion and said inner periphery of said adapter bore on its first inlet port side is sealed, and the annulus between said outer periphery of said shuttle second end portion and said inner periphery of said axial bore on the second inlet port side of said second inlet port side shoulder is not sealed,
      ii) when the collar engages the second inlet port side shoulder, the annulus between said outer periphery of said shuttle second end portion and said inner periphery of said axial bore on its second inlet port side is sealed, and the annulus between said outer periphery of said shuttle first end portion and said inner periphery of said adapter bore on the first inlet port side of said first inlet port side shoulder is not sealed, and
      iii) when the collar does not engage and is distally spaced from either shoulder, the annulus between said outer periphery of said shuttle second end portion and said inner periphery of said axial bore on the second inlet port side of said second inlet port side shoulder is sealed, and the annulus between said outer periphery of said shuttle first end portion and said inner periphery of said adapter on the first inlet port side of said first inlet port side shoulder is also sealed.

14. The valve of claim 13 in which at least one of said end portions of said shuttle has a central bore and at least one fluid passage connecting said bore to the periphery of the shuttle, and in which said at least one said soft seal is fixed on said outer periphery of said at least one end portion between said collar and said at least one passage.

15. The valve of claim 13 in which said body has at least one passage in fluid communication with said body bore between a said soft seal on the inner periphery of the body bore and the shoulder proximate said seal.

16. The valve of claim 13 in which said adapter and said body each are is internally longitudinally grooved adjacent said bores thereof leaving bearing ribs between the grooves extending in the direction of the axis of the bores, the grooves providing flow passages extending the length of the bearing ribs, said cylindrical end portions slidingly engaging said bearing ribs when moving along said bores.

17. The valve of claim 16 in which the ends of said ribs comprise the shoulder.

18. The valve of claim 13 further comprising
   a) an elongate tubular housing having
      i) first and second end portions,
      ii) a central bore,
      iii) a spring seat formed in said central bore distal from said first end portion of the housing,
      iv) said second end portion of the housing being sealingly fastened to said body adjacent said body's first inlet port with said central bore coaxial with and in fluid communication with said body bore,
      v) an inlet in said first end portion of the housing in fluid communication with said central bore,
   b) an elongate stem passing through said housing and connecting on one end to said first end portion of said shuttle, the other end comprising a spring retainer of diameter allowing said stem to coaxially moveably slide in said central bore of the housing and to allow fluid to flow from said housing inlet into said central bore, and
   c) a spring surrounding a portion of the stem and positioned in the elongate tubular housing on said spring seat and in contact with the spring retainer, said spring urging said stem toward said housing inlet in response to reduction of fluid pressure in said housing inlet or in response to fluid pressure in a portion of said body bore in fluid communication with said outlet higher than fluid pressure in said housing inlet.

19. The valve of claim 18 in which at least one of said end portions of said shuttle has a central bore and at least one fluid passage connecting said bore to the periphery of the shuttle, and in which said at least one said soft seal is fixed on said outer periphery of said at least one end portion between said collar and said at least one passage.

20. The valve of claim 18 in which said body has at least one passage in fluid communication with said body bore between a said soft seal on the inner periphery of the body bore and the shoulder proximate said seal.

21. A valve comprising:
   a. a body having an axial bore with first and second openings and a fluid pressure function outlet from said bore, said outlet being transverse to said bore;
   b. a first adapter received in said bore of said body at said first opening in sealing engagement with said body and having:
      i. opposite first and second ends, said second end being distal from said first opening, and
      ii. an axial bore between the first and second ends coaxial with said body bore and forming a first fluid flow inlet port at said first end, said first adapter bore widening distally from said first end to provide a first shoulder adjacent said outlet and spaced from said first end;
   c. a second adapter received in said body bore at said second opening in sealing engagement with said body and having:
      i. opposite first and second ends, said second end of the second adapter being distal from said second opening, and
      ii. an axial bore between the first and second ends of said second adapter coaxial to said body bore and forming a second fluid flow inlet port at said first end of the second adapter, said second adapter bore widening distally from said first end of said second adapter to provide a second shoulder adjacent said outlet and spaced from said first end of said second adapter;
   d. a shuttle coaxial with said body bore and having:
      i. first and second cylindrical end portions, said first end portion extending in the direction of the first inlet port of the body and coaxially slideably movable along said first adapter bore, said second end portion extending in the direction opposite said first end portion and being coaxially slideably moveable along said second adapter bore,
      ii. a collar between the first and second end portions of the shuttle, said collar having an outer cylindrical surface of diameter receivable within the widened adapter bores and of diameter greater than the end portions of the shuttle and the adapter bores in which said end portions slideably move,
      iii. said shuttle moving from one shoulder to the other shoulder such that when said collar engages the shoulder on the first adapter, the collar does not engage the shoulder on the second adapter, and when the collar engages the shoulder on the second adapter, the collar does not engage the shoulder on the first adapter,
   e. at least one first soft seal fixed on either the outer periphery of said shuttle first end portion or the inner periphery of the first adapter bore, for sealing an annulus between said outer periphery of said shuttle first end portion and the inner periphery of said first adapter bore when said collar engages the first adapter shoulder,
   f. at least one second soft seal fixed on either the outer periphery of said shuttle second end portion or the inner periphery of the second adapter bore, for sealing an annulus between said outer periphery of said shuttle second end portion and said inner periphery of said second adapter bore when said collar engages the second adapter shoulder,
   g. said soft seals being placed sufficiently distally outwardly from said shoulders in the direction of said inlet ports and said end portions extending for a distance from said collar, such that:
      i) when the collar engages the first adapter shoulder, the annulus between the outer periphery of the shuttle first end portion and said inner periphery of the first adapter bore is sealed, and the annulus between said outer periphery of said shuttle second end portion and said inner periphery of said second adapter bore is not sealed,
      ii) when the collar engages the second adapter shoulder, the annulus between the outer periphery of the shuttle second end portion and said inner periphery of the second adapter bore is sealed, and the annulus between said outer periphery of said shuttle first end portion and said inner periphery of said first adapter bore is not sealed, and iii) when said collar does not engage and is distally spaced from either shoulder, the annulus between said outer periphery of said shuttle first end portion and said inner periphery of said first adapter bore is sealed, and the annulus between said outer periphery of said shuttle second end portion and said inner periphery of said second adapter bore is also sealed.

22. The valve of claim 21 in which at least one of said end portions of said shuttle has a central bore and at least one fluid passage connecting said bore to the periphery of the shuttle, and in which said at least one said soft seal is fixed on said outer periphery of said at least one end portion between said collar and said at least one passage.

23. The valve of claim 21 in which said bore or bores of at least one of said first and second adapters has or have at least one passage in fluid communication with said bore or bores of at least one of said first and second adapters, between a said soft seal on the inner periphery of the bore or bores of at least one of said first and second adapters and the shoulder nearest said seal.

24. The valve of claim 21 in which at least one of said adapters is internally longitudinally grooved adjacent said bore of the adapter leaving bearing ribs between the grooves extending in the direction of the axis of the adapter, the grooves providing flow passages extending the length of the bearing ribs, said cylindrical end portions slidingly engaging said bearing ribs when moving along said adapter bore.

25. The valve of claim 24 in which said shoulders comprise the ends of said ribs.

26. The valve of claim 21 in which said first inlet port is coaxial with said bore, and further comprising:
   a. an elongate tubular housing having
      i. first and second end portions,
      ii. a central bore,
      iii. a spring seat formed in said central bore distal from said first end portion of the housing,
      iv. said second end portion of the housing being sealingly fastened to said body adjacent said first inlet port with said central bore coaxial with and in fluid communication with said body bore,
      v. an inlet in said first end portion of the housing in fluid communication with said central bore,
   b. an elongate stem passing through said housing and connecting on one end to said first end portion of said shuttle, the other end comprising a spring retainer of diameter allowing said stem to coaxially moveably slide in said central bore of the housing and to allow fluid to flow from said housing inlet into said central bore, and
   c. a spring surrounding a portion of the stem and positioned in the elongate tubular housing on said spring seat and in contact with the spring retainer, said spring urging said stem toward said housing inlet in response to reduction of fluid pressure in said housing inlet or in response to fluid pressure in a portion of said body bore in fluid communication with said outlet higher than fluid pressure in said housing inlet.

27. The valve of claim 26 in which at least one of said end portions of said shuttle has a central bore and at least one fluid passage connecting said bore to the periphery of the shuttle, and in which said at least one said soft seal is fixed on said outer periphery of said at least one end portion between said collar and said at least one passage.

28. The valve of claim 26 in which said bore or bores of at least one of said first and second adapters has or have at least one passage in fluid communication with said bore or bores of at least one of said first and second adapters between a said soft seal on the inner periphery of the bore or bores of at least one of said first and second adapters and the shoulder nearest said seal.

29. The valve of claim 1 in which a second soft seal is fixed either on the outer periphery of said shuttle second end if said first soft seal is fixed on the outer periphery of said shuttle first end portion, or on the inner periphery of the body bore on the second inlet port side if said first soft seal is fixed on the inner periphery of the body bore on its first inlet port side, for sealing an annulus between said outer periphery of said shuttle second end portion and said inner periphery of said body bore on the second inlet port side when said collar engages the second inlet port side shoulder.

30. The valve of claim 13 in which a second soft seal is fixed either on the outer periphery of said shuttle second end if said first soft seal is fixed on the outer periphery of said shuttle first end portion, or on the inner periphery of the adapter bore on its second inlet port side if said first soft seal is fixed on the inner periphery of the adapter bore on its first inlet port side, for sealing an annulus between said outer periphery of said shuttle second end portion and said inner periphery of said adapter bore on its second inlet port side when said collar engages the second inlet port side shoulder.

31. The valve of claim 21 in which a second soft seal is fixed either on the outer periphery of said shuttle second end if said first soft seal is fixed on the outer periphery of said shuttle first end portion, or on the inner periphery of the second adapter bore on its second inlet port side if said first soft seal is fixed on the inner periphery of the first adapter bore on its first inlet port side, for sealing an annulus between said outer periphery of said shuttle second end portion and said inner periphery of said second adapter bore on the second inlet port side when said collar engages the second inlet port side shoulder.

* * * * *